(12) United States Patent
Saiki et al.

(10) Patent No.: US 7,991,181 B2
(45) Date of Patent: Aug. 2, 2011

(54) LOUDSPEAKER SYSTEM

(75) Inventors: Shuji Saiki, Nara (JP); Toshiyuki Matsumura, Osaka (JP)

(73) Assignee: Panasonic Corporation, Osaka (JP)

( * ) Notice: Subject to any disclaimer, the term of this patent is extended or adjusted under 35 U.S.C. 154(b) by 1166 days.

(21) Appl. No.: 11/663,558

(22) PCT Filed: Aug. 29, 2005

(86) PCT No.: PCT/JP2005/015682
§ 371 (c)(1),
(2), (4) Date: Mar. 23, 2007

(87) PCT Pub. No.: WO2006/035564
PCT Pub. Date: Apr. 6, 2006

(65) Prior Publication Data
US 2007/0195982 A1 Aug. 23, 2007

(30) Foreign Application Priority Data

Sep. 27, 2004 (JP) .................................. 2004-279052

(51) Int. Cl.
*H04R 1/02* (2006.01)
*H04R 1/20* (2006.01)
(52) U.S. Cl. .......................... 381/386; 381/353; 381/354
(58) Field of Classification Search .................. 381/345, 381/349, 353, 354, 386, 387; 181/146, 149, 181/151, 198, 199
See application file for complete search history.

(56) References Cited

U.S. PATENT DOCUMENTS

| 2,766,839 | A | 10/1956 | Baruch et al. |
| 4,657,108 | A | 4/1987 | Ward |
| 2004/0251077 | A1 | 12/2004 | Wright et al. |

FOREIGN PATENT DOCUMENTS

| FR | 2 665 996 | 2/1992 |
| JP | 55-29877 | 8/1978 |
| JP | 56-73614 | 6/1981 |
| JP | 56-92111 | 7/1981 |
| JP | 56-155012 | 12/1981 |
| JP | 60-500645 | 5/1985 |
| JP | 3-202108 | 9/1991 |
| JP | 4-3698 | 1/1992 |
| JP | 04-146220 | 5/1992 |
| JP | 6-339190 | 12/1994 |
| JP | 7-33854 | 8/1995 |
| JP | 2001-261319 | 9/2001 |
| JP | 2003-204588 | 7/2003 |
| JP | 2003-225564 | 8/2003 |
| JP | 2004-537938 | 12/2004 |
| WO | 03/013183 | 2/2003 |

OTHER PUBLICATIONS

Sumitomo Bakelite Co., Ltd., "Sumiliteresin Technical Report", Phenol Jushi Kyujo Kokabutsu ACS Series, Aug. 26, 2004, 3rd edition.

(Continued)

*Primary Examiner* — Tuan Nguyen
(74) *Attorney, Agent, or Firm* — Wenderoth Lind & Ponack, L.L.P.

(57) ABSTRACT

A speaker unit is attached to an opening section formed on an front surface of a cabinet. In an inside of the cabinet, fibrous activated carbon (activated carbon fiber) is located. A pressure change in the inside of the cabinet, which changes according to a sound pressure of the speaker unit, is suppressed by physical adsorption by the activated carbon. Further, since the activated carbon fiber has micro pores, which physically adsorbs a gaseous body, situated on a surface of the fiber, a loss in acoustic energy at the time of physical adsorption is small, and thus it is possible to prevent deterioration in a sound pressure level.

20 Claims, 23 Drawing Sheets

OTHER PUBLICATIONS

Japanese Office Action issued Mar. 18, 2009 in the corresponding Japanese application.

Japanese Office Action issued Dec. 19, 2008 in corresponding Japanese application No. JP2008-111710.

Extended European Search Report issued Oct. 26, 2010 in corresponding European Application No. 05 77 4537.

Japanese Office Action (Notice of Reasons for Rejection) issued Aug. 17, 2010 in Japanese Application No. 2008-111710 corresponding to the present U.S. application.

LOUDSPEAKER SYSTEM

TECHNICAL FIELD

The present invention relates to a loudspeaker system, more particularly to a loudspeaker system which has a small cabinet and is capable of realizing bass reproduction.

BACKGROUND ART

In a conventional loudspeaker system, it is difficult to realize, due to an effect of acoustic stiffness caused by an internal cavity of a cabinet, a loudspeaker system which is small and capable of bass reproduction. This reproduction limit of bass is determined depending on a degree of the acoustic stiffness, that is, a capacity of the cabinet. Thus, as one of the solutions to the problem of the reproduction limit of the bass, a loudspeaker system having an aggregate of granular activated carbon located in an inside of the cabinet thereof is suggested (for example, see patent document 1).

FIG. 22 is a tectonic profile of a main section of a conventional loudspeaker system. In FIG. 22, the conventional loudspeaker system comprises a cabinet 90, a woofer 91, activated carbon 92, a supporting material 93, and a diaphragm 94. The woofer 91 is attached on a front surface of the cabinet 90. The activated carbon 92 is formed by granular activated carbon (hereinafter referred to as granular activated carbon), and located, in an aggregated state, in an inside of the cabinet 90. Further, the activated carbon 92 is supported by a back surface, a bottom surface, an upper surface, and right and left side surfaces of the cabinet 90, and the supporting material 93. Note that the supporting material 93 has pores, which allow passage of air, formed on an entire surface thereof.

Next, an operation of the conventional loudspeaker system shown in FIG. 22 will be described. When an electric signal is applied to the woofer 91, a sound pressure is generated. With the sound pressure, a pressure of the inside of the cabinet 90 changes. And with this pressure change, the diaphragm 94 vibrates. With this vibration of the diaphragm 94, a pressure of a cavity having the activated carbon 92 located therein changes. The activated carbon 92 is supported, in an aggregated state, by the supporting material 93 and the cabinet 90. Note that the entire surface of the supporting material 93 has, as above described, pores formed thereon. Therefore, with the pressure change caused by the vibration of the diaphragm 94, a gaseous body is physically adsorbed into the activated carbon 92, and the pressure change of the inside of the cabinet 90 is suppressed. That is, the cabinet 90 operates equivalently as a cabinet having a large capacity. In this way, in the conventional loudspeaker system, the activated carbon 92 equivalently expands an internal capacity of the cabinet, thereby enabling the bass reproduction, in spite of a small cabinet, as if the speaker unit is accommodated in a large cabinet.
Patent Document 1: Japanese National Phase PCT Laid-Open Publication No. 60-500645

Here, a structure of the activated carbon 92 will be studied. The activated carbon 92 of the above-described conventional loudspeaker system is formed by an aggregate of granular activated carbon having an average particle size of 0.1 mm to 0.3 mm. Countless numbers of pores are formed in an inside of the granular activated carbon. A specific surface area per unit weight of the granular activated carbon is about 1000 $m^2/g$. As shown in FIG. 23, the pores are broadly classified into macro pores 100 formed in the vicinity of a surface of the granular activated carbon, and micro pores 101 formed in an inside thereof. FIG. 23 is a diagram typically showing a structure of the pore formed in the granular activated carbon.

In FIG. 23, it is thought that the gaseous body is physically adsorbed into the infinite number of micro pores 101 formed in the inside of the granular activated carbon, whereby the activated carbon 92 exerts an effect of a capacity expansion as above described. Note that, each of the macro pores 100 functions as a path for the gaseous body to reach each of the micro pores 101.

However, in the granular activated carbon having a particle size no less than 0.1 mm, a volume ratio of macro pores 100 is larger compared to that of the micro pores 101, and thus an effect of physical adsorption is limited. Therefore, to obtain, significantly, the effect of the physical adsorption, a large amount of the granular activated carbon is required, and a volume of the activated carbon 92 is required to be expanded. However, in the case of a small-size loudspeaker system whose cabinet has a small internal capacity, the volume of the activated carbon 92 to be accommodated is limited. Therefore, the effect of the physical adsorption cannot be achieved sufficiently, and consequently it is difficult to expand a desired bass reproduction range.

Further, the macro pores 100, which function as the path for the gaseous body, act as acoustic resistance which suppresses a flow of the gaseous body reaching the micro pores 101. Therefore, there is a problem where a loss in acoustic energy is caused by the acoustic resistance, and consequently a sound pressure level of a bass range deteriorates significantly.

Further, when a frequency range of the sound pressure becomes high, the macro pores 100 form, in cavity capacities of the paths and lengths of the paths thereof, a high-cut filter which blocks off sound transmission. Accordingly, with respect to a high range of 100-200 Hz or higher, the flow of the gaseous body into the micro pores 101 is suppressed. Therefore, with respect to the high range of 100-200 Hz or higher, the effect of the physical adsorption is hardly obtained, and consequently there remains a big problem where use of the activated carbon 92 is limited to a loudspeaker system dedicated to a bass range of 100 Hz or lower.

Therefore, the present invention is related to a loudspeaker system to solve the above-described problem. In particular, the system is directed to improve expansion of an equivalent capacity by the effect of the physical adsorption by the activated carbon, and also prevent deterioration in the sound pressure level, which is caused by the loss in the acoustic energy, thereby realizing a small size loudspeaker system capable of reproducing rich bass.

SUMMARY OF THE INVENTION

The first aspect of the present invention is a loudspeaker system, comprising: a cabinet; a speaker unit fixed to the cabinet; and fibrous activated carbon located in an internal space of the cabinet.

The second aspect of the present invention is characterized in that, in the above-described first aspect, the cabinet is a closed-type cabinet.

The third aspect of the present invention further comprises, in the above-described first aspect, an acoustic port which is attached to the cabinet, and acoustically connects the internal space of the cabinet with an external space thereof.

The fourth aspect of the present invention is characterized in that, in the above-described third aspect, the activated carbon is firmly fixed to an inside of the cabinet so as not to block a space between an opening section which is, of opening sections at both edges of the acoustic port, connected to the internal space of the cabinet and the speaker unit.

The fifth of the present invention further comprises, in the above-described first aspect, a passive radiator which is attached to the cabinet and driven in response to vibration of the speaker unit.

The sixth aspect of the present invention is characterized in that, in the above-described fifth aspect, the activated carbon is firmly fixed to the inside of the cabinet so as not to block a space between the speaker unit and the passive radiator.

The seventh aspect of the present invention further comprises, in the above-described fifth aspect, a plate-like material firmly fixed between the passive radiator and the activated carbon such that an air gap is formed between the passive radiator and the plate-like material.

The eighth aspect of the present invention is characterized in that, in the above-described first aspect, the activated carbon is wrapped in a shielding material which at least blocks off air.

The ninth aspect of the present invention is characterized in that, in the above-described eighth aspect, the shielding material is formed by a thin film.

The tenth aspect of the present invention is characterized in that, in the above-described ninth aspect, a material of the thin film is polyvinyl chloride or polyvinylidene chloride.

The eleventh aspect of the present invention is characterized in that, in the above-described first aspect, the activated carbon is generated from phenol resin.

The twelfth aspect of the present invention is characterized in that, in the above-described first aspect, the speaker unit is of any of an electrodynamic type, a piezoelectric type, an electrostatic type, or an electromagnetic type.

The thirteenth aspect of the present invention is characterized in that, in the above-described first aspect, a specific surface area of the activated carbon is 500 $m^2/g$ or more.

The fourteenth of the present invention is characterized in that, in the above-described first aspect, the activated carbon has a constitution in which activated carbon in a cloth form is laminated.

The fifteenth aspect of the present invention is characterized in that, in the above-described fourteenth aspect, a direction of the activated carbon in the cloth form being laminated is perpendicular to a traveling direction of a sound radiated from the speaker unit.

The sixteenth aspect of the present invention is characterized in that, in the above-described fifteenth aspect, the activated carbon in the cloth form is laminated in a spiral manner.

The seventeenth aspect of the present invention is a portable terminal device comprising; the loudspeaker system described in any of the above aspects; and a case supporting the loudspeaker system.

The eighteenth aspect of the present invention is characterized in that, in the above-described seventeenth aspect, the speaker unit comprises: a voice coil; and a diaphragm having the voice coil firmly fixed on one surface thereof; the speaker unit is attached such that another surface of the diaphragm faces the internal space.

The nineteenth aspect of the present invention is the loudspeaker system, in the above-described seventeenth aspect, further comprising a dustproof material which is firmly fixed to the inside of the cabinet so as to divide off the speaker unit and the activated carbon.

The twentieth aspect of the present invention is a vehicle, comprising: the loudspeaker system described in any of the above aspects; and a vehicle body having the loudspeaker system located in an inside thereof.

The twenty-first aspect of the present invention is a video device, comprising: the loudspeaker system described in any of the above aspects; and a housing having the loudspeaker system located in an inside thereof.

EFFECTS OF THE INVENTION

According to the above-described first aspect, an effect of physical adsorption by the fibrous activated carbon can improve expansion of an equivalent capacity, and also prevent deterioration in a sound pressure level caused by a loss in acoustic energy, thereby providing a small size loudspeaker system capable of reproducing rich bass. Further, according to the present aspect, the fibrous activated carbon does not have the macro pores which form a high-cut filter, and thus the effect of the physical adsorption is exerted even in a high-pass range of 100-200 Hz or higher. That is, according to the present aspect, reproduction of the rich bass, which results from exertion of the effect of the physical adsorption, can be realized even in a small cabinet whose reproduction frequency range of a low range is relatively high.

According the above-described second aspect, since the inside of the cabinet is closed, the activated carbon does not directly have contact with ambient air outside of the cabinet. Accordingly, it is possible to prevent deterioration in performance of the activated carbon caused by adsorption of moisture and unnecessary gases.

According to the above-described third aspect, with an operation as a loudspeaker system based on a phase inversion method, it is possible to further expand a reproduction limit of a bass range.

According to the above-described fourth aspect, it is possible to prevent a loss in an operation as the bass-reflex system, which is caused by the activated carbon blocking between the speaker unit and the acoustic port.

According to the above-described fifth aspect, with the operation as the loudspeaker system based on the phase inversion method, it is possible to further expand the reproduction limit of the bass range.

According to the above-described sixth aspect, it is possible to prevent the loss in the operation as the phase inversion method, which is caused by the activated carbon blocking between the speaker unit and the passive radiator.

According to the above-described seventh aspect, it is possible to prevent the passive radiator, at the time of driving, from having contact with the activated carbon.

According to the above-described eighth to tenth aspects, it is possible to prevent, in the loudspeaker system using, for example, the acoustic port which connects the external space and the internal space of the cabinet, deterioration in the activated carbon by preventing the activated carbon from having direct contact with the ambient air.

According to the above-described eleventh aspect, the phenol resin is a material which tends to form, therein, a number of micro pores physically adsorbing a gaseous body, and thus fibrous activated carbon having a large specific surface area can be obtained.

According to the above-described thirteenth aspect, it is possible to provide, to a user, improvement in a bass sound sensation resulting from the effect of the physical adsorption by the activated carbon.

According to the above-described fourteenth aspect, cloth-type activated carbon is arranged in a laminated manner. The activated carbon is therefore located at a desired position easily, compared to a case in which the activated carbon is not located in a laminated manner.

According to the above-described fifteenth aspect, the activated carbon is laminated such that a lamination direction thereof is perpendicular to the traveling direction of the sound. Thus, a gap which is in the same direction as the traveling direction of the above-described sound is formed between fiber and fiber of the activated carbon, and consequently the sound radiated from the speaker unit can easily pass through the gap. As a result, the loss caused before the gaseous body is physically adsorbed is reduced, whereby it is possible to reduce significantly the deterioration in the sound pressure level in the bass range.

According to the above-described sixteenth aspect, lamination in a spiral manner can be done easily, thereby reducing a manufacturing time.

According to the above-described eighteenth aspect, a structure is such that coarse particulates of the activated carbon, etc. do not have contact with the voice coil due to the diaphragm located, with respect to the voice coil, at an internal space side. Thus, it is possible to prevent a failure due to an electrical short circuit and occurrence of an abnormal sound both of which are caused by the coarse particulates of the activated carbon, etc. having contact with the voice coil.

According to the above-described nineteenth aspect, a structure is such that the dustproof material prevents the coarse particulates of the activated carbon, etc. from entering into the speaker unit. Thus, it is possible to prevent the abnormal sound which is caused by the coarse particulates of the activated carbon, etc. having contact with the diaphragm, etc.

Figure 1:
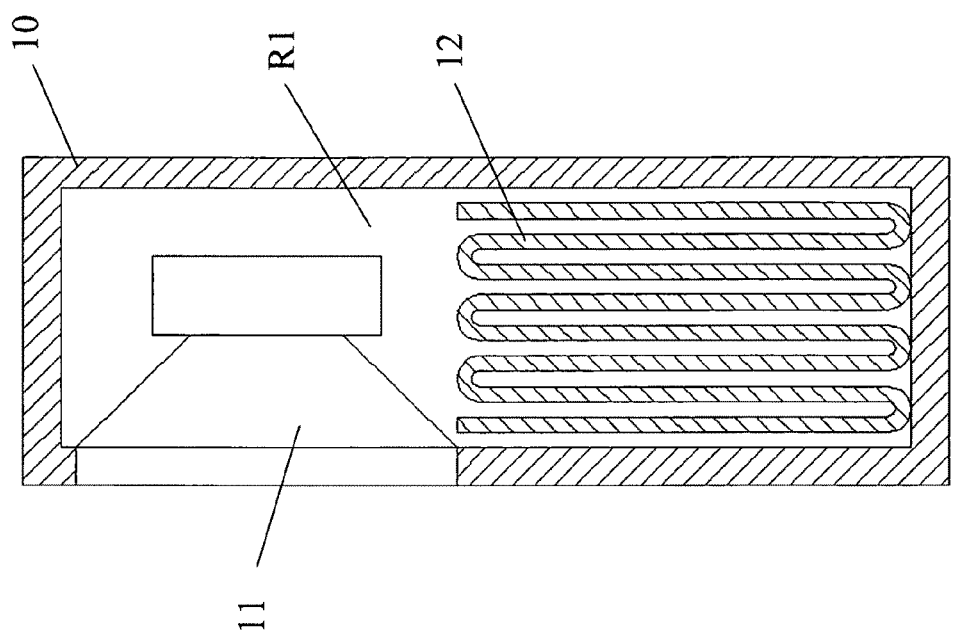
FIG. 1 is a tectonic profile showing an example of a loudspeaker system according to a first embodiment.

DESCRIPTION OF THE REFERENCE CHARACTERS 10, 20, 30, 77 cabinet
11, 50, 72 speaker unit
12 activated carbon
21 acoustic port
22, 32, 412 divider
23 shielding material
31 passive radiator
311, 56 diaphragm
312 suspension
40 cellular phone
41 main frame case
42 liquid crystal display
43, 82 loudspeaker system
44 antenna
45 hinge section
411 opening section
51 frame
52 yoke
53 magnet
54 plate
55 voice coil
57 gasket
58 dustproof mesh
70 window section
71 main door unit
75 seat
78 pedestal
79 punching net
80 flat-screen television main body
81 display 100 macro pore
101 micro pore

DETAILED DESCRIPTION OF THE INVENTION

Hereinafter, embodiments of the present invention will be described with reference to drawings.

First Embodiment

A loudspeaker system according to a first embodiment of the present invention will be described with reference to FIG. 1. FIG. 1 is a tectonic profile showing an example of the loudspeaker system according to the first embodiment. In FIG. 1, the loudspeaker system comprises a cabinet 10, a speaker unit 11, and activated carbon 12. Note that the loudspeaker system shown in FIG. 1 is a closed-type loudspeaker system.

In FIG. 1, the speaker unit 11 is, for example, an electrodynamic speaker. The speaker unit 11 is attached to an opening section formed on a front surface of the cabinet 10. The activated carbon 12 is formed by fibrous activated carbon (hereinafter referred to as activated carbon fiber). The activated carbon 12 is located in an inside of the cabinet 10. An internal space of the cabinet 10, which is a space excluding the above described speaker unit 11 and the activated carbon 12, is referred to as a space R1.

Figure 2:
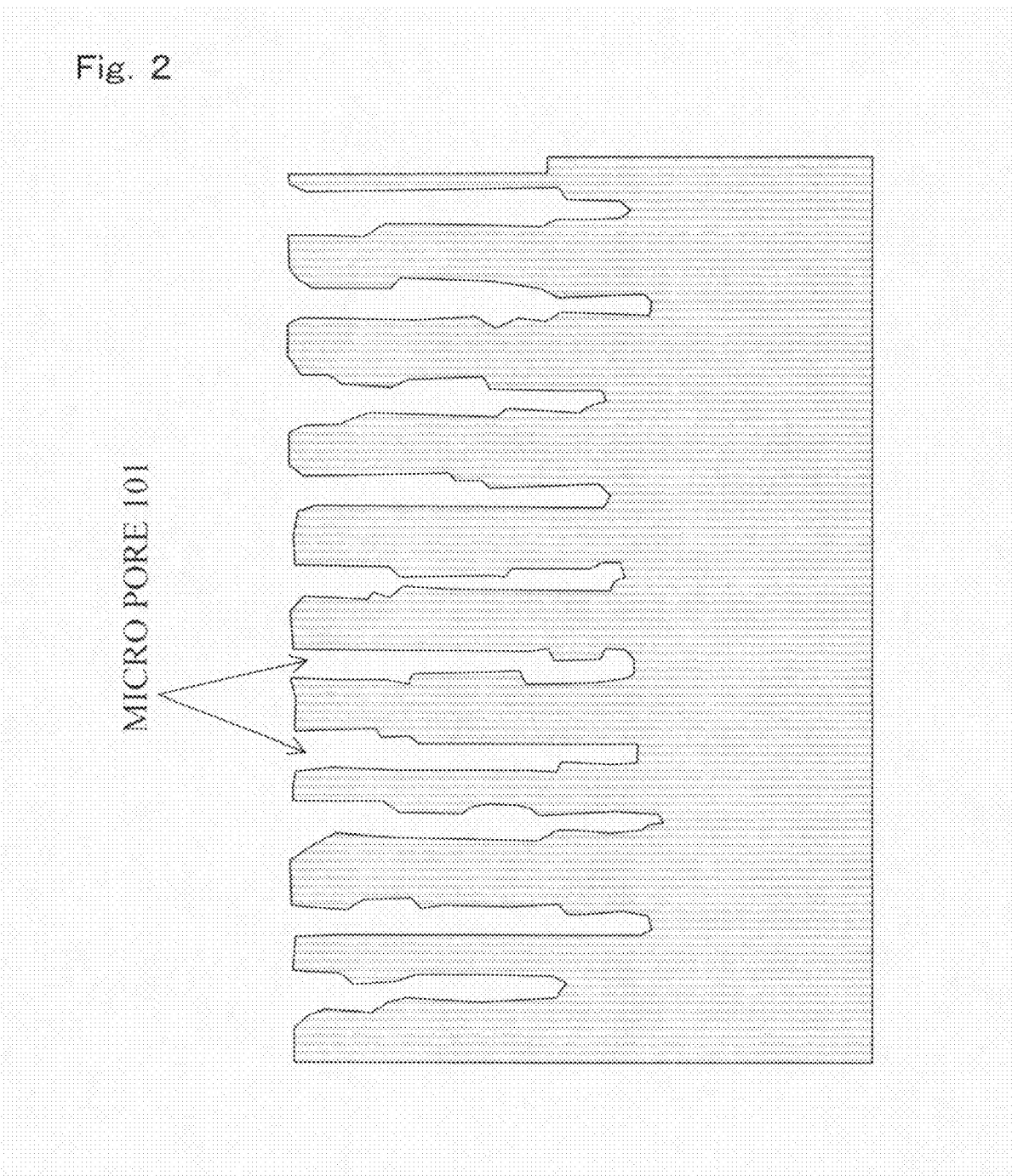
FIG. 2 is a diagram typically showing pores formed in activated carbon fiber.

The activated carbon 12 is formed by the activated carbon fiber. In this case, as a specific example, the activated carbon fiber woven into a cloth-like material is used. The activated carbon 12 is located in the inside of the cabinet 10 in a folded manner (in a laminated manner). Here, pores formed in the activated carbon fiber are, as shown in FIG. 2, only micro pores 101. That is, the above-described macro pores 100 are not formed in the activated carbon fiber, but the micro pores 101 are directly formed on a surface of the activated carbon fiber. FIG. 2 is a diagram typically showing the pores formed on the activated carbon fiber. As a material for generating the activated carbon fiber, for example, a resin such as phenol, cellulose, acrylonitrile, or pitch, etc. may be named. The phenol resin, particularly, is a material which tends to form the micro pores thereon in large numbers compared to other resins, and is a material from which the activated carbon fiber having a large specific surface area can be obtained. Note that, as a generating method, there is, for example, such a method that processes, under high temperature, and then carbonizes the cloth-type activated carbon fiber.

Next, an operation of the above-described loudspeaker system will be described. The speaker unit 11 is the electrodynamic speaker, and when an electric signal is applied, a driving force will be generated in a voice coil. With the driving force, a diaphragm of the speaker unit 11 vibrates, thereby generating a sound pressure. And with the sound pressure generated from the diaphragm, a pressure of the space R1 which is formed in the inside of the cabinet 10 changes. However, due to physical adsorption by the activated carbon 12, a change in a pressure of the inside of the cabinet 10 is suppressed, and an internal capacity of the cabinet 10 expands equivalently.

Figure 3:
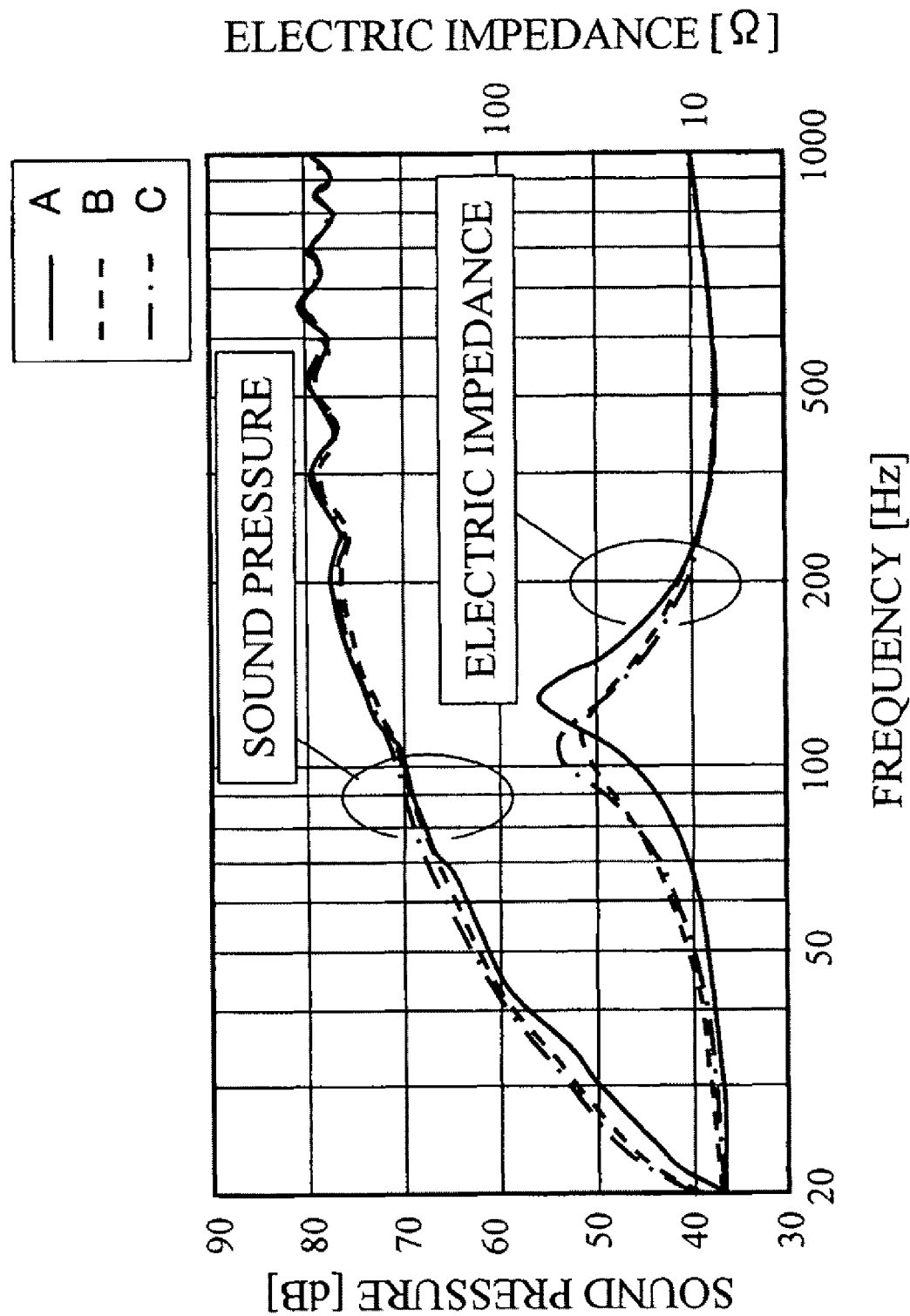
FIG. 3 is a diagram showing an actual measurement result showing an effect of activated carbon 12, which is formed by the activated carbon fiber.

FIG. 3 is a diagram showing an actual measurement result showing an effect of the activated carbon 12, which is formed by the activated carbon fiber. Further, FIG. 3 shows measurement results of sound pressure/frequency characteristics and electric impedance characteristics of a case where the activated carbon 12 is not included in an 8 cm-diameter speaker attached to a cabinet having a capacity of 0.5 liter, a case where the conventional granular activated carbon is included therein, and a case where the activated carbon fiber is included therein, respectively. In FIG. 3, measurement results are shown respectively, in graph A, relating to a case where the activated carbon 12 is not included, in graph B, relating to a case where 120 g of the conventional granular activated carbon (material: phenol resin, particle size: $\phi1.0$ to $\phi2.0$ mm, micro pore size: approximate $\phi1.5$ nm) is included, and in graph C, relating to a case where 46 g of the cloth-type activated carbon fiber (material: phenol resin, micro pore size: approximate $\phi1.5$ nm) is included.

In graph A of the case where the activated carbon 12 is not included, a resonance frequency is expressed as $f_{OA}=129.1$ Hz, and quality factor, which shows sharpness of resonance of an electric impedance, is expressed as $Q_A=5.71$. In graph B of the case where the granular activated carbon is included, the resonance frequency is expressed as $f_{OB}=112.5$ Hz, and the quality factor is expressed as $Q_B=2.91$. In graph C of the case where the activated carbon fiber is included, the resonance frequency is expressed as $f_{OC}=107.4$ Hz, and the quality factor is expressed as $Q_C=4.08$. Based on a relation that the resonance frequency is proportional to the square of a cabinet capacity, an expansion ratio of the cabinet capacity in the case of graph B using the conventional granular activated carbon is expressed as $(f_{OA}/f_{OB})^2=1.3$. Further, the case of graph C using the activated carbon fiber is expressed as $(f_{OA}/f_{OC})^2=1.4$. Accordingly, the case where the activated carbon fiber is used can further increase the expansion ratio of the capacity than the case where the conventional granular activated carbon is used.

Further, a degree of a loss in acoustic energy in the process of the activated carbon 12 adsorbing a gaseous body can be evaluated with a Q value of the electric impedance. The larger the loss is, the smaller the Q value becomes. Compared to $Q_B=2.91$ in the case of the granular activated carbon shown in graph B, the case of the activated carbon fiber in graph C is expressed as $Q_C=4.08$. According to this result, it is clear that the activated carbon fiber has a small loss in the acoustic energy compared the conventional granular activated carbon. In the case of the conventional granular activated carbon, the gaseous body passes through the macro pores 100 during the process of flowing into the micro pores 101, thereby generating the loss in the acoustic energy. On the other hand, since the activated carbon fiber has the micro pores situated on the surface of the fiber, the gaseous body is directly flowed into and adsorbed to the micro pores. That is, it can be said that the activated carbon fiber has the small loss in the acoustic energy compared to the granular activated carbon.

Next, effects of differences in the resonance frequency and resonance quality factor given on the sound pressure/frequency characteristic will be studied. First, the sound pressure/frequency characteristics in graph B and graph C respectively have high sound pressure levels in a bass range of 100 Hz or lower, compared to the sound pressure/frequency characteristic of graph A of the case where the activated carbon 12 is not included. This is because of an effect of a capacity expansion of the granular activated carbon and the activated carbon fiber. Further, when graph B and graph C are compared to each other, it is clear that the activated carbon fiber, compared to the conventional granular activated carbon, has a small loss in the acoustic energy during the process of the physical adsorption of the gaseous body, thereby having a high sound pressure level in the bass range of 100 Hz or lower.

Further, as above described, in the case of the granular activated carbon, when a frequency range of the sound pressure becomes high, each of the macro pores 100 functioning as a path for the gaseous body forms, in a cavity capacity of the path thereof and a path length thereof, a high-cut filter which blocks off sound transmission. Therefore, in a high range of 100-200 Hz or higher, an effect of the physical adsorption has hardly been obtained. Compared with this, in the activated carbon fiber of the present embodiment, the macro pores are not formed, the activated carbon 12 can exert the effect of the physical adsorption even in the high range of 100-200 Hz or higher. Accordingly, the present invention is also useful for an apparatus having a small cabinet whose reproduction frequency range of a low range is relatively high.

As above described, according to the loudspeaker system of the present embodiment, with the use of the activated carbon fiber, expansion of an equivalent capacity can be improved, and deterioration in the sound pressure level caused by the loss in the acoustic energy can be prevented, whereby it is possible to provide a small size loudspeaker system reproducing rich bass.

Note that, according to the above description, the activated carbon 12 to be used is the cloth-type activated carbon fiber, but is not limited thereto. For example, filiform or chopped activated carbon fiber may be used. Further, in the above description, the cloth-type activated carbon fiber is located in the inside of the cabinet 10 in a folded manner. However, a plurality of layers of the cloth-type activated carbon fiber, which is small enough not to be folded, may be arranged in a laminated manner. Further, the activated carbon fiber may be combined fiber which uses polyester fiber, pulp or the like, as a binder. Furthermore, the activated carbon fiber may be such that is formed, with a die applied and the binder deposited thereto, into a given shape. The above-described applied method comes within the spirit and scope of the present invention, according to which the gaseous body is physically adsorbed to a surface of a material.

Further, in the measurement shown in FIG. 3, the activated carbon fiber having a micro pore size of about ϕ1.5 nm is used for the measurement. As the activated carbon fiber to be used for the present invention, the activated carbon fiber having a micro pore size of about ϕ1.0 nm to ϕ2.5 nm is preferable. Further, the specific surface area of the activated carbon fiber, for example, is preferably 500 $m^2/g$ or more. The specific surface area [$m^2/g$] corresponds to a surface area per unit weight, and is used as a measure of performance of the physical adsorption.

Figure 4:
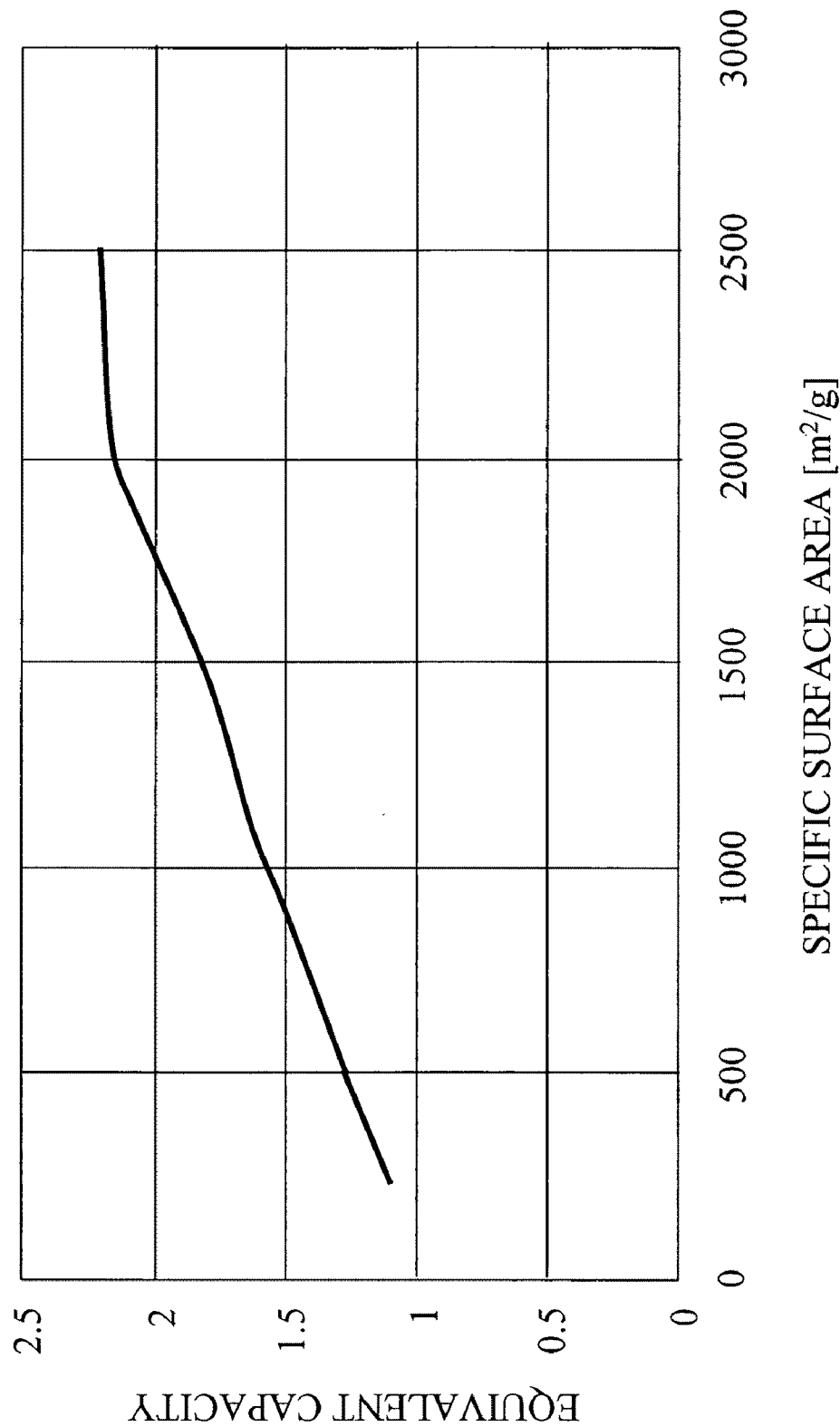
FIG. 4 is a diagram showing a measurement result of an effect of capacity expansion depending on a specific surface area.

Hereinafter, the reason why the specific surface area is preferably 500 $m^2/g$ or more will be described. As above described, the micro pores of the activated carbon fiber are situated on the surface thereof. Therefore, it is thought that the larger the specific surface area of the activated carbon fiber is, the larger the number of micro pores is. FIG. 4 is a diagram showing a measurement result of the effect of the capacity expansion depending on the specific surface area. Note that FIG. 4 is a result of measurement which uses the cabinet having the capacity of 0.5 liter and the activated carbon fiber having different specific surface areas located therein. Further, for the measurement, the activated carbon fiber made of the phenol resin as a material is used. Further, in FIG. 4, a vertical axis and a horizontal axis show a capacity equivalently expanded (equivalent capacity) compared to the cabinet capacity in the case without the activated carbon fiber, and the specific surface area, respectively. As shown in FIG. 4, it is clear that, in the case where the activated carbon fiber having a specific surface area of 500 $m^2/g$ is used, the equivalent capacity is about 1.3 times. It is clear that, in the case where the activated carbon having a specific surface area of 1700 to 1800 $m^2/g$ or more is used, the equivalent capacity is 2 times or more.

Figure 5:
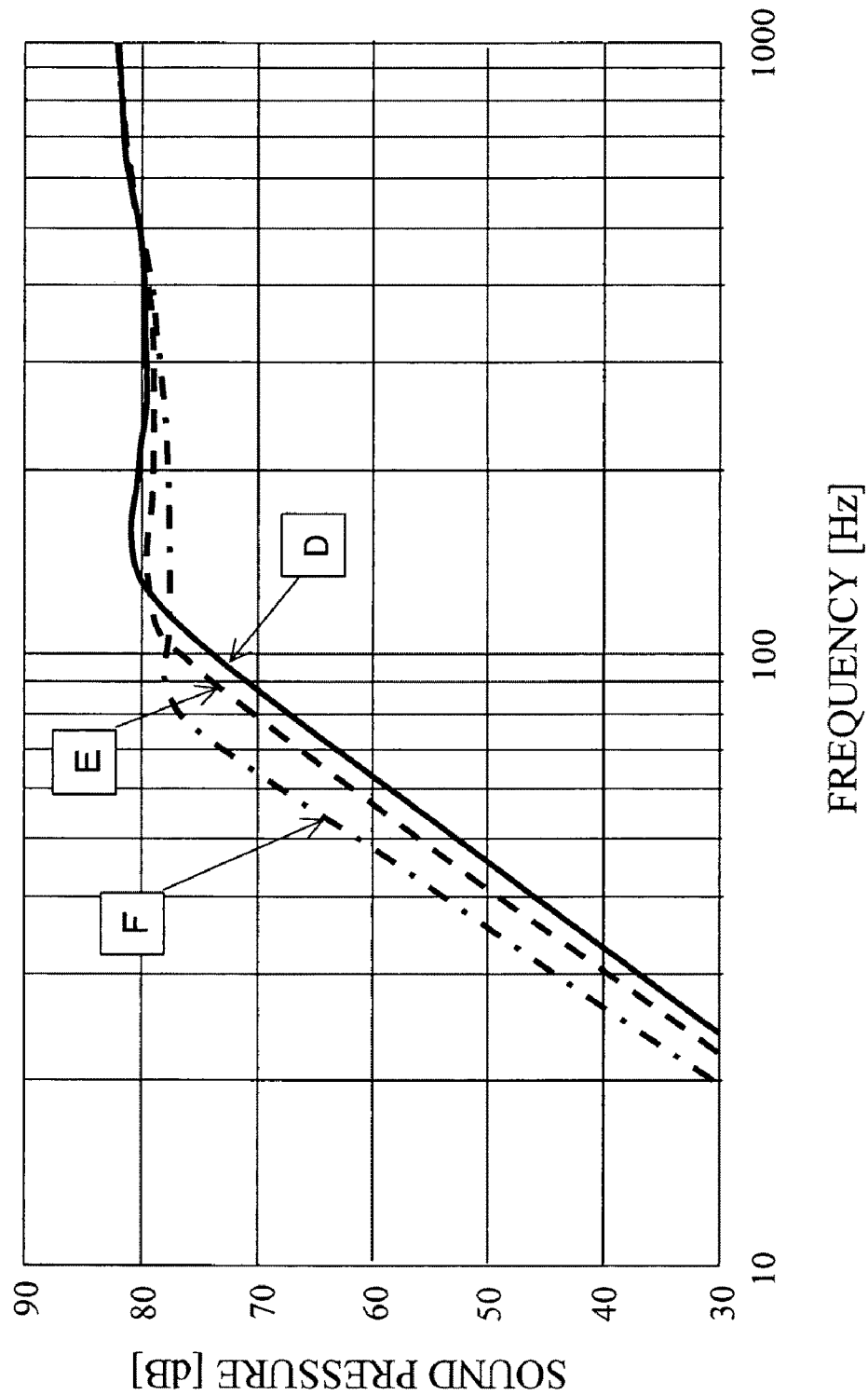
FIG. 5 is a diagram of a graph based on calculation of a relation between an equivalent capacity and a sound pressure/frequency characteristic.

FIG. 5 is a diagram of a graph based on calculation of a relation between the equivalent capacity and the sound pressure/frequency characteristic. As a condition of the calculation, a bass-reflex system with the cabinet having the capacity of 0.5 liter is set as a standard, and a case where an 8 cm-diameter speaker is attached thereto is regarded as the condition thereof. Further, in FIG. 5, graph D, graph E, and graph F show the sound pressure/frequency characteristics of a case where the activated carbon fiber is not included in the inside of the cabinet, a case where the equivalent capacity is 1.3 times, and a case where the equivalent capacity is 2 times, respectively. When graph E and graph D are compared to each other, it is clear that the sound pressure level in graph E is higher by about 3 dB in the vicinity of a frequency of 90 Hz. That is, with the use of the activated carbon fiber having the specific surface area of 500 $m^2/g$, the equivalent capacity is expanded by 1.3 times, and the sound pressure level improves by about 3 dB. And if the sound pressure level differs by about 3 dB, it is predicted that an improvement in the bass range can be recognized in terms of auditory perception. Therefore, it can be said that, as the specific surface area of the activated carbon fiber, 500 $m^2/g$ or more is preferable. It is thought that the effect of the expansion of the equivalent capacity which is caused by the activated carbon fiber may vary depending on a fiber material to be used and the micro pore size etc., however, even in such cases, the effect of the capacity expansion is preferably 1.3 times or more.

Second Embodiment

Figure 6:
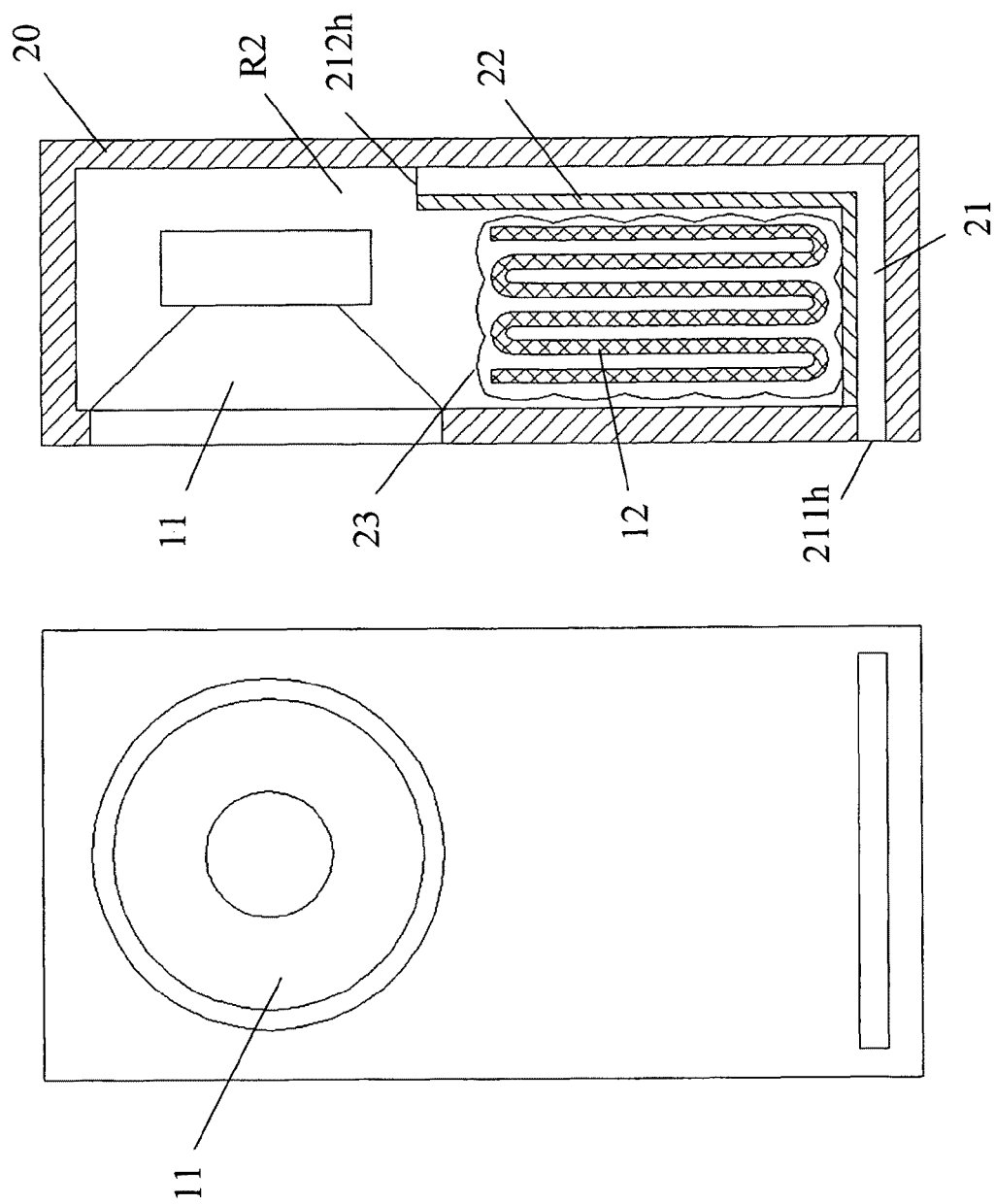
FIG. 6 is a diagram showing a front view of the loudspeaker system and a tectonic profile of a side surface thereof according to a second embodiment.

A loudspeaker system according to a second embodiment will be described with reference to FIG. 6. The loudspeaker system according to the present embodiment is a bass-reflex type loudspeaker system having an acoustic port 21, compared to the loudspeaker system according to the first embodiment, and is different in that activated carbon 12 thereof is wrapped in a shielding material 23. Hereinafter, different points will be mainly described. FIG. 6 is a diagram showing a front view of the loudspeaker system and a tectonic profile of a side surface thereof according to the second embodiment. In FIG. 6, the loudspeaker system comprises a cabinet 20, a speaker unit 11, a divider 22, the activated carbon 12, and the shielding material 23. Note that the speaker unit 11 and the activated carbon 12 are the same as those in the above-described first embodiment, and thus common reference characters are provided thereto and an explanation thereof is omitted.

In FIG. 6, the speaker unit 11 is attached to an opening section formed at an upper portion of a front surface of the cabinet 20. At a lower portion of the front surface of the cabinet 20, an opening section 211$h$ is formed. The divider 22 is a plate-like material. The divider 22 is firmly fixed to an inside of the cabinet 20 such that the acoustic port 21 is formed with the divider 22, the opening section 211$h$, an opening section 212$h$ which is described hereinbelow, and an internal side of the cabinet 20. With this acoustic port 21, the loudspeaker system according to the present embodiment operates as the bass-reflex type loudspeaker system. The activated carbon 12 is, as with the above-described first embodiment, formed by activated carbon fiber.

The shielding material 23 is, for example, a sack-like thin film which does not allow air to pass through. The thin film may be, for example, a nylon film or the like 0.1 mm or less in thickness. Note that the thin film may be a thin film made of such material as, for example, polyvinyl chloride and polyvinylidene chloride.

The activated carbon 12 is wrapped, in a folded manner, in the shielding material 23, and located in the inside of the cabinet 20. Further, an internal space of the cabinet 20, which is a space between a back surface of the above-described speaker unit 11 and an upper side of the activated carbon 12 wrapped in the shielding material 23, is referred to as a space R2. The opening section 212h, which is an opening section at a side opposite to the opening section 211h of the acoustic port 21 and formed in the inside of the cabinet 20, is located in the space R2. In this way, the acoustic port 21 is such that acoustically connects the space R2, which is the internal space of the cabinet 20, with an external space of the cabinet 20. Further, the opening section 212h is located at a space between the back surface of the speaker unit 11 and the opening section 212h, where the activated carbon 12 is not located. Accordingly, it is possible to prevent an operational loss of a bass-reflex system, which is caused by the activated carbon 12 blocking between the speaker unit 11 and the acoustic port 21. Further, the loudspeaker system according to the present embodiment is of a structure where the inside of the cabinet 20 is ventilated with ambient air via the acoustic port 21. However, as above described, the activated carbon 12 is wrapped in the shielding material 23, whereby it is possible to prevent deterioration in performance of the activated carbon 12 caused by adsorption of moisture in the ambient air, and unnecessary gas, etc.

Next an operation of the above-described loudspeaker system will be described. The speaker unit 11 is an electrodynamic speaker, and when an electronic signal is applied, a driving force is generated in a voice coil. With this driving force, a diaphragm of the speaker unit 11 vibrates, thereby generating a sound pressure. And with the sound pressure generated from the diaphragm, a pressure of the space R2 formed in the inside of the cabinet 20 changes. This change in the pressure transmits to a surface of the shielding material 23, and then vibrates the shielding material 23. With this vibration, a pressure in an inside of the shielding material 23 changes. However, due to physical adsorption by the activated carbon 12 located in the inside of the shielding material 23, a change in the pressure of the inside of the shielding material 23 is suppressed. That is, the activated carbon 12 suppresses the change in the pressure of the inside of the cabinet 20 via the shielding material 23, thereby expanding an equivalent capacity of the cabinet 20, as with the first embodiment. Further, the loudspeaker system according to the present embodiment has the acoustic port 21. Accordingly, the loudspeaker system operates as a loudspeaker system having a bass-reflex system, which corresponds to one of the phase inversion methods.

Figure 7:
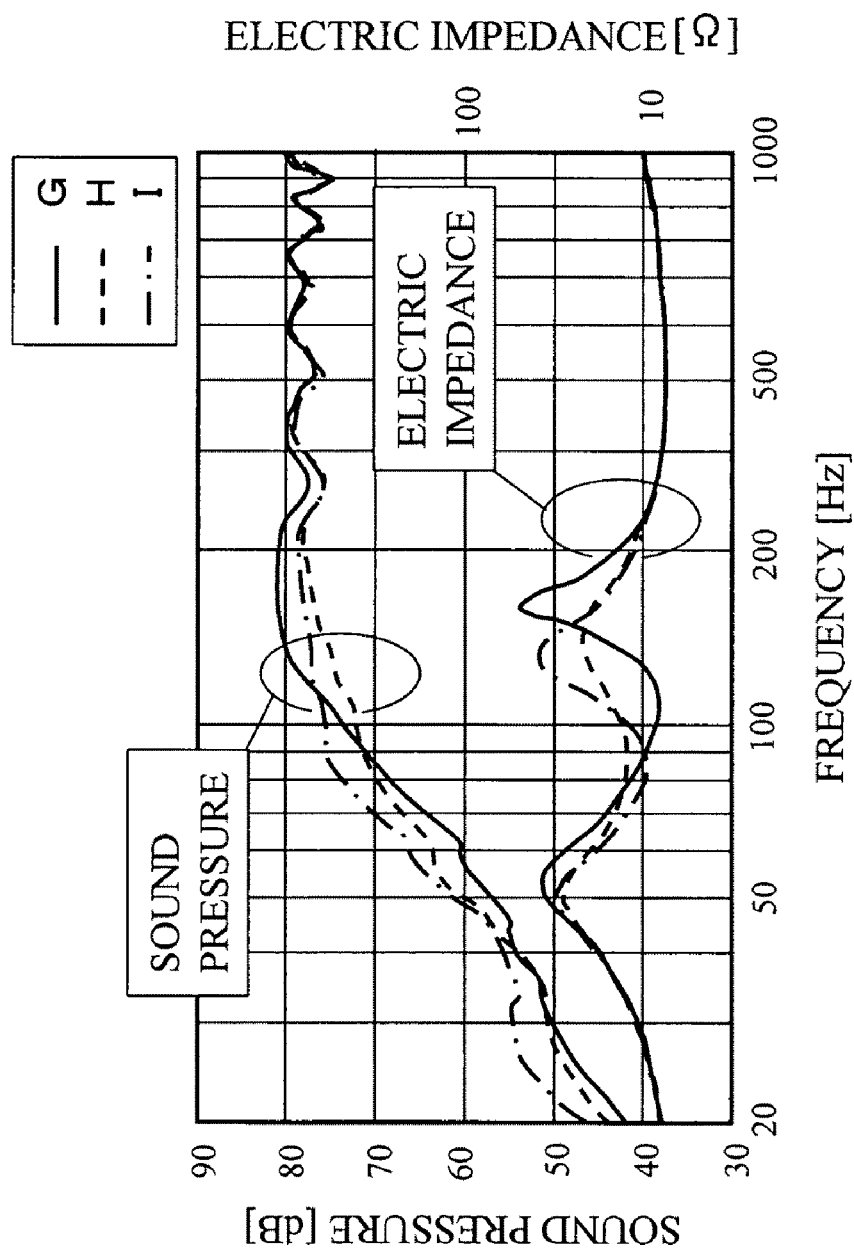
FIG. 7 is a diagram showing an actual measurement result showing an effect of the activated carbon 12, which is formed by the activated carbon fiber.

FIG. 7 is a diagram showing an actual measurement result showing an effect of the activated carbon 12, which is formed by the activated carbon fiber. Further, FIG. 7 shows measurement results of sound pressure/frequency characteristics and electric impedance characteristics of a case where the activated carbon 12 is not included in an 8 cm-diameter speaker attached to a cabinet having a capacity of 0.5 liter, a case where the conventional granular activated carbon is included therein, and a case where the activated carbon fiber is included therein, respectively. In FIG. 7, measurement results are shown, respectively, in graph G, relating to a case where the activated carbon 12 is not included, in graph H, relating to a case where 120 g of the conventional granular activated carbon (material: phenol resin, particle size: $\phi$1.0 mm to $\phi$2.0 mm, micro pore size: approximate $\phi$1.5 nm) is included, and in graph I, relating to a case where 46 g of cloth-type activated carbon fiber (material: phenol resin, micro pore size: approximate $\phi$1.5 nm) is included.

Hereinafter, only the sound pressure/frequency characteristics in FIG. 7 will be described. The sound pressure/frequency characteristics of graph H and graph I respectively have high sound pressure levels in a bass range of 100 Hz or lower, compared to graph G of the case where the activated carbon 12 is not included. This is because of an effect of capacity expansion of the granular activated carbon and the activated carbon fiber. Further, when graph H and graph I are compared to each other, it is clear that the activated carbon fiber, compared to the conventional granular activated carbon, has a small loss in acoustic energy during the process of a gaseous body flowing into the micro pores 101, thereby having a high sound pressure level in a bass range of 200 Hz or lower. For example, at a frequency of 80 Hz, graph I of the activated carbon fiber is higher by about 4 dB than graph H of granular activated carbon.

As above described, the loudspeaker system according to the present embodiment can operate as the bass-reflex system having a further large-scale capacity, based on the effect of the capacity expansion of the activated carbon 12 and the operation as the bass-reflex system. That is, the loudspeaker system according to the present embodiment can further expand a reproduction limit of the bass range, compared to the closed-type loudspeaker system described in the first embodiment.

Further, according to the loudspeaker system of the present embodiment, the activated carbon fiber is wrapped in the shielding material 23, whereby a reproduction range limit of the bass range can be expanded further stably without the activated carbon deteriorated, even in the loudspeaker system having the bass-reflex system in which the inside of the cabinet 20 is ventilated with the ambient air.

Further, the above-described opening section 212h of the acoustic port 21 is located at the space R2 between the back surface of the speaker unit 11 and the shielding material 23. That is, a structure is formed such that the activated carbon 12 and the shielding material 23 do not block between the opening section 212h and the back surface of the speaker unit 11. Accordingly, the loudspeaker system according to the present embodiment can prevent occurrence of the operational loss of the bass-reflex system.

Figure 8:
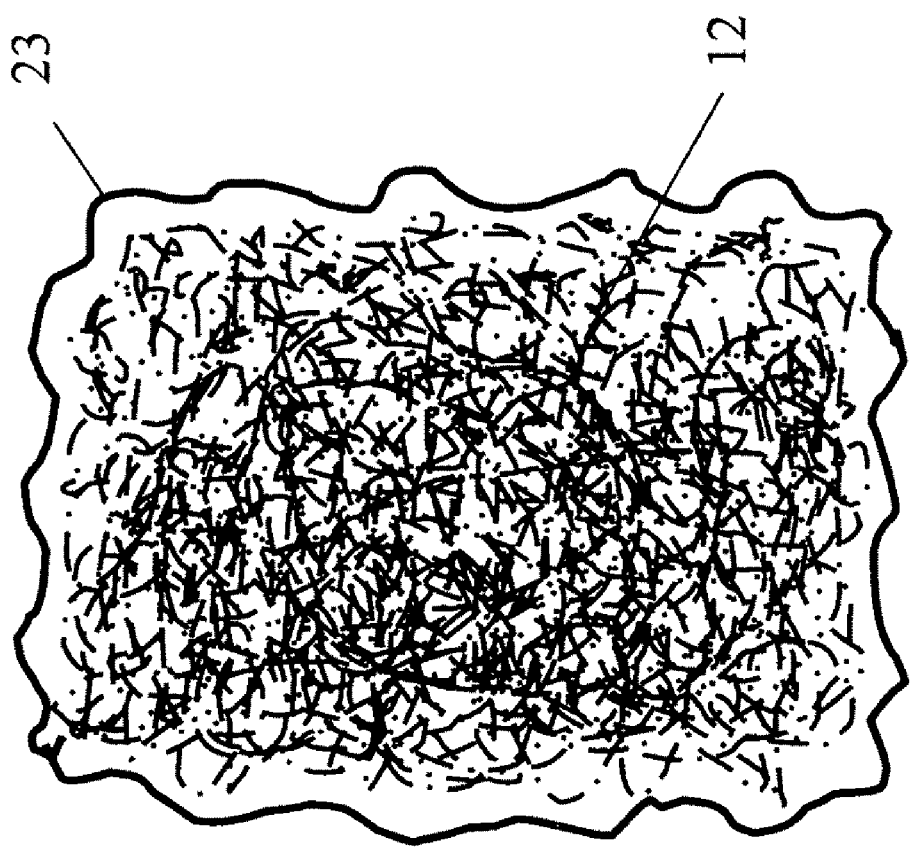
FIG. 8 is a diagram showing filiform activated carbon fiber wrapped in a shielding material 23.

Note that, in the present embodiment, the activated carbon 12 may be, for example, in the form of filiform activated carbon fiber as shown in FIG. 8, and the filiform activated carbon fiber may be wrapped in the shielding material 23. FIG. 8 is a diagram showing the filiform activated carbon fiber wrapped in the shielding material 23. In this case, the filiform activated carbon fiber is, with the shielding material 23, expected to have an effect of being shielded from the ambient air and also an effect of preventing dispersal of filiform fiber into the inside of the cabinet. Further, if the activated carbon fiber is chopped off into chops, the shielding material 23 can even exert the effects of blocking of the ambient air and dispersal prevention.

Third Embodiment

Figure 9:
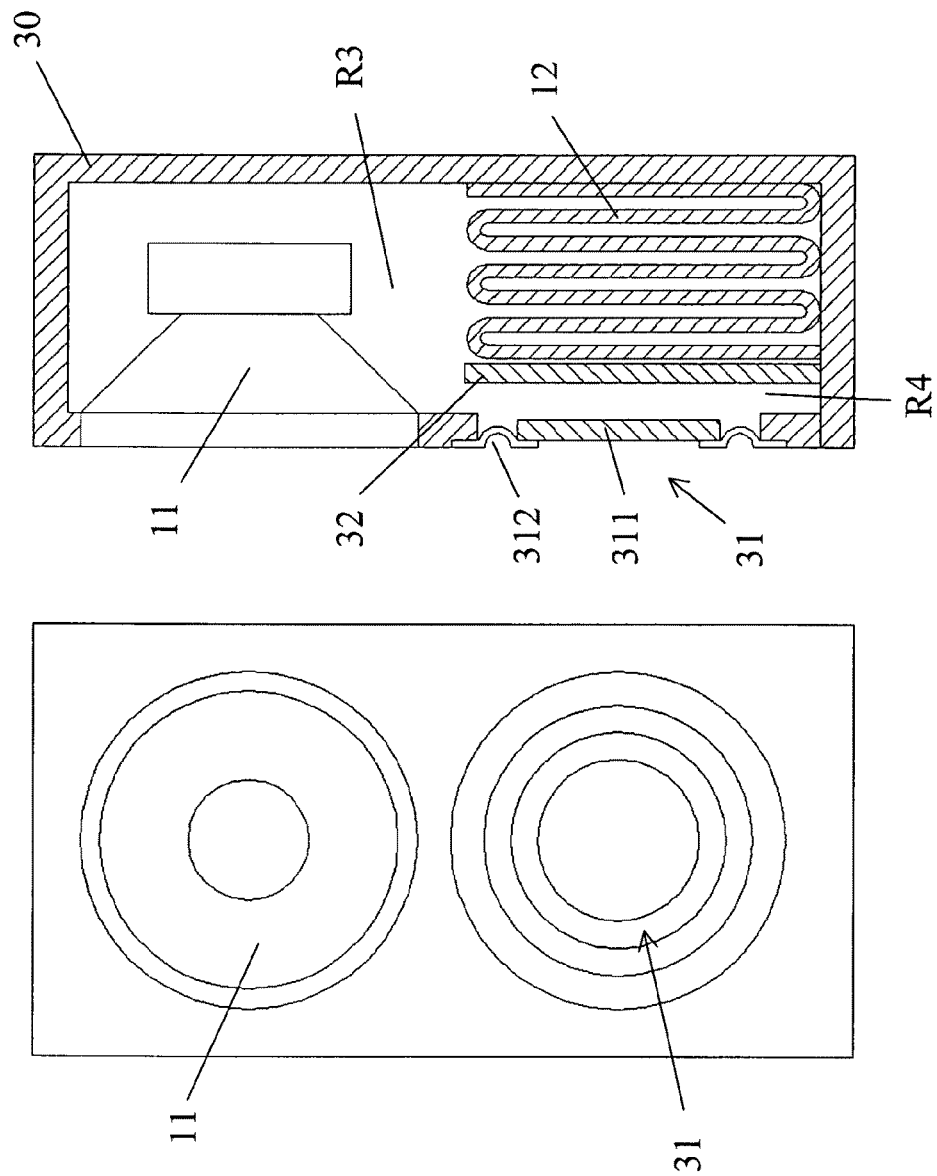
FIG. 9 is a diagram showing a front view and a tectonic profile of a side surface of the loudspeaker system according to a third embodiment.

With reference to FIG. 9, a loudspeaker system according to a third embodiment will be described. The loudspeaker system according to the present embodiment is a loudspeaker system having a passive radiator 31, that is, a so-called passive radiator type loudspeaker system, which is different from the loudspeaker system according to the first embodiment. Hereinafter, different points will be mainly described. FIG. 9 is a diagram showing a front view and a tectonic profile of a side surface of the loudspeaker system according to the third embodiment. In FIG. 9, the loudspeaker system comprises a cabinet 30, a speaker unit 11, activated carbon 12, the passive radiator 31, and a divider 32. Note that the speaker unit 11 and the activated carbon 12 are the same as those described above in the first embodiment, and thus common reference characters are provided thereto and an explanation thereof is omitted.

In FIG. 9, the speaker unit 11 is attached to an opening section formed at an upper portion of a front surface of the cabinet 30. The passive radiator 31 is constituted of a diaphragm 311 and a suspension 312. The passive radiator 31 is attached to an opening section formed at a lower portion of the front surface of the cabinet 30. The diaphragm 311 is, for example, formed by a disk-shaped material. An inner circumference portion of the suspension 312 is firmly fixed to an outer circumference portion of the diaphragm 311, and supports the outer circumference of the diaphragm 311 such that the diaphragm 311 is operable to vibrate. An outer circumference portion of the suspension 312 is firmly fixed to the opening section formed at the lower portion of the front surface of the cabinet 30. The activated carbon 12 is, as with the above-described first embodiment, formed by activated carbon fiber. The activated carbon 12 is located in an inside of the cabinet 30. An internal space of the cabinet 30, which corresponds to a space between a back surface of the above-described speaker unit 11 and an upper side of the activated carbon 12, is referred to as a space R3. The divider 32 is made of a plate-like material, and firmly fixed to a position which is in the inside of the cabinet 30, and divides off the passive radiator 31 and the activated carbon 12. Further, the divider 32 is firmly fixed having a space R4 situated between the divider 32 and the passive radiator 31. The space R4 formed by the divider 32 can prevent the passive radiator 31 from having contact with the activated carbon 12. Further, the space R3 and the space R4 are connected with each other. Accordingly, an operational loss of the phase inversion method, which is caused by the activated carbon 12 blocking between the speaker unit 11 and the passive radiator 31 can be prevented. In this way, the divider 32 is made of the plate-like material to form the space R4, and corresponds to a supporting material for supporting the activated carbon 12.

Next, an operation of the above-described loudspeaker system will be described. The speaker unit 11 is an electrodynamic speaker, and when an electronic signal is applied, a driving force is generated in a voice coil. With the driving force, the diaphragm of the speaker unit 11 vibrates, thereby generating a sound pressure. And with the sound pressure generated from the diaphragm, a pressure in spaces R3 and R4 which are formed in the inside of the cabinet 30 changes. However, due to physical adsorption by the activated carbon 12 located in the inside of the cabinet 30, a change in the pressure of the internal space (spaces R3 and R4) of the cabinet 30 is suppressed. That is, the activated carbon 12 suppresses the change in the pressure of the inside of the cabinet 30, and, as with the first embodiment, expands an equivalent capacity of the cabinet 30.

Further, the loudspeaker system according to the present embodiment has the passive radiator 31 attached at the lower portion of the front surface of the cabinet 30. And the passive radiator 31 is acoustically connected to the space R3 at the back surface of the speaker unit 11 via the space R4. That is, the passive radiator 31 is driven in response to vibration of the speaker unit 11. Accordingly, the loudspeaker system according to the present embodiment operates as a loudspeaker system having a passive radiator system, which corresponds to one of the phase inversion methods.

As above described, the loudspeaker system according to the present embodiment can further expand, based on an effect of a capacity expansion of the activated carbon 12 and the operation as the passive radiator system, a reproduction limit of a bass range, compared to the closed-type loudspeaker system described in the first embodiment.

Further, the loudspeaker system according to the present embodiment has the passive radiator 31 accommodated therein, whereby the inside of the cabinet 30 does not have contact with ambient air. Therefore, according to the loudspeaker system according to the present embodiment, it is possible to prevent deterioration in the activated carbon 12 and improve a further stable expansion of a reproduction range limit of the bass range.

Note that the loudspeaker system according to the present embodiment is of a structure where the inside of the cabinet 30 does not have contact with the ambient air, and thus the activated carbon 12 is not specifically required to be wrapped in the shielding material 23 as described in the second embodiment. However, from the viewpoint of long-term prevention of deterioration in an effect of adsorption by the activated carbon 12, the activated carbon 12 may be wrapped in the shielding material 23. Accordingly, the deterioration in the activated carbon 12 can be prevented in the long term.

In the loudspeaker system shown in FIG. 9, a lamination direction of the activated carbon 12 may be in any direction. However, it is specifically preferable to locate the activated carbon 12 in the lamination direction as shown in FIG. 9. Hereinafter, a preferable lamination direction and a reason thereof will be described.

In the above description, as with the first embodiment, as the activated carbon 12, the cloth-type activated carbon fiber is located in the inside of the cabinet 30 in a laminated manner. In this case, depending on the lamination direction of the activated carbon 12, an acoustic characteristic of the activated carbon 12 varies significantly. Difference of the acoustic characteristic depending on the lamination direction becomes apparent by measuring an acoustic impedance which is observed from an approaching side of the sound (from a side of the space R3) and presented, in a traveling direction of a sound which passing through the activated carbon 12, by the activated carbon 12. Note that the traveling direction of the sound corresponds, according to FIG. 9, to a direction from the back surface of the speaker unit 11 toward the activated carbon 12. Further, the lamination direction of the activated carbon 12 corresponds, according to FIG. 9, to an anteroposterior direction of the cabinet 30. In this way, in FIG. 9, the lamination direction of the activated carbon 12 is perpendicular to the traveling direction of the sound. In other words, the lamination direction of the activated carbon 12 corresponds to a direction in which the activated carbon 12 does not receive the sound radiated from the back surface of the speaker unit 11 on a plane surface thereof. The activated carbon 12 is laminated perpendicular to the traveling direction of the sound, whereby a gap is formed, in the same direction as the above-described traveling direction of the sound, between fiber and fiber of the activated carbon 12. Further, at least a portion of the gap is formed so as to have contact with the space R3.

Figure 10:
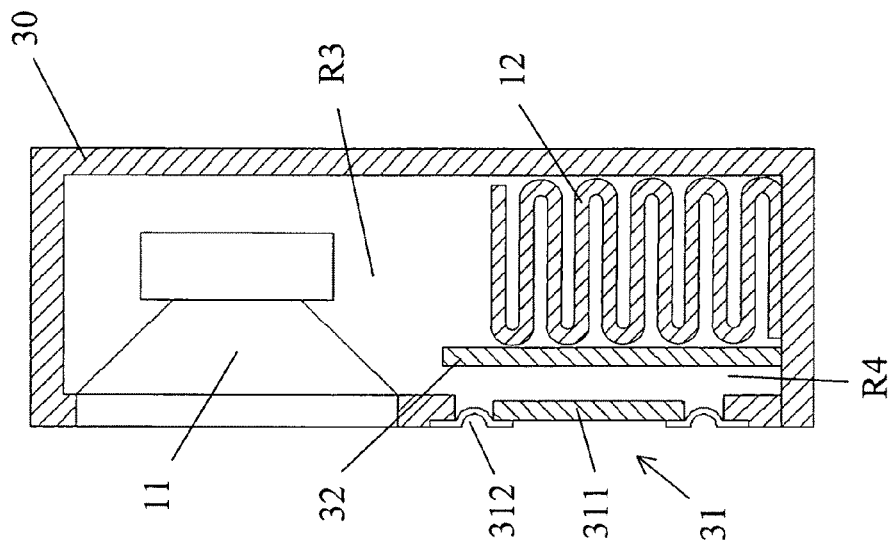
FIG. 10 is a tectonic profile of the loudspeaker system having the activated carbon 12 located with a lamination direction thereof being changed.
Figure 10:
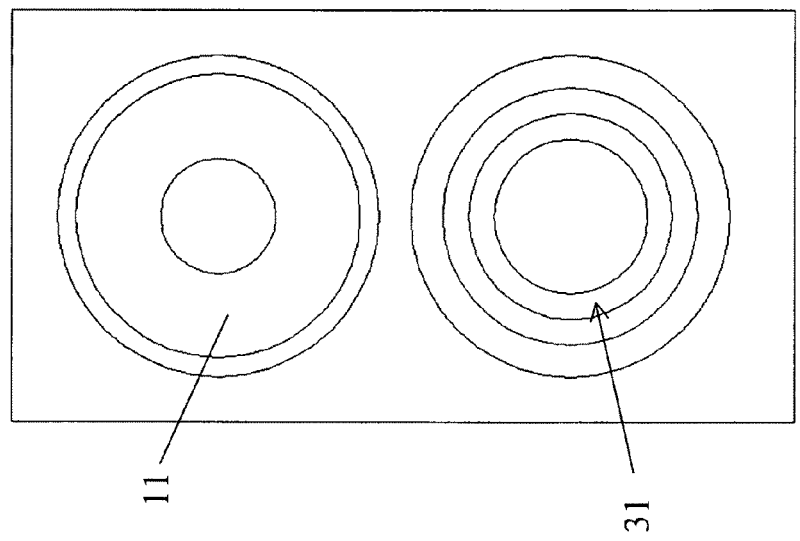

Here, to describe the difference of the acoustic characteristic depending on a difference in the lamination direction, a case where the activated carbon 12 is located in the lamination direction as shown in FIG. 10, for example, will be studied. FIG. 10 is a tectonic profile of the loudspeaker system having the activated carbon 12 located with the lamination direction thereof being changed. The lamination direction of the activated carbon 12 shown in FIG. 10 is a vertical direction of the cabinet 30. That is, the lamination direction of the activated carbon 12 shown in FIG. 10 is in the same direction as the above-described traveling direction of the sound. In other words, the lamination direction of the activated carbon 12 shown in FIG. 10 is a direction in which the activated carbon 12 receives the sound generated from the back surface of the speaker unit 11 on the plane surface thereof.

Figure 11:
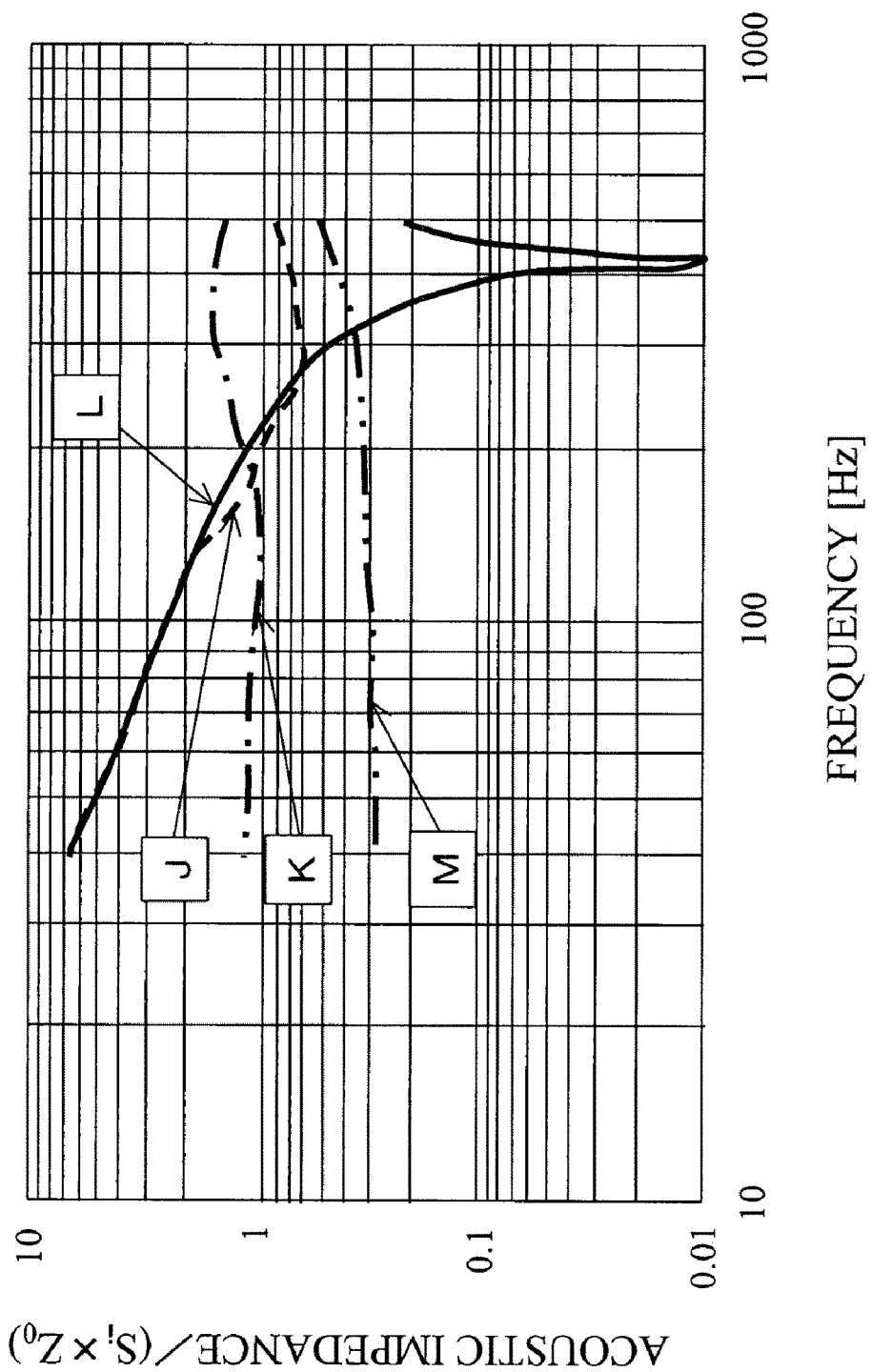
FIG. 11 is a diagram showing a measurement result of an acoustic impedance in the case where the activated carbon 12 is located, with the lamination direction thereof being changed, in an inside of a cabinet having a capacity of 0.5 liter.

With reference to FIG. 11, the acoustic characteristic of each of the lamination directions of the activated carbon 12 shown in FIGS. 9 and 10 will be described. FIG. 11 is a diagram showing a measurement result of the acoustic impedance in the case where the activated carbon 12 is located, with the lamination direction thereof being changed, in an inside of a cabinet having a capacity of 0.5 liter. In FIG. 11, the activated carbon 12 is formed by the cloth-type activated carbon fiber having a specific surface area of 2000 m²/g and a total weight of 40 g. Note that the acoustic impedance in FIG. 11 corresponds to a result obtained by measuring a change in the sound pressure characteristic of an inside of an acoustic tube connected to the above described cabinet. Further, measurement values shown in FIG. 11 are expressed by a specific acoustic impedance normalized by product of an area Si of an opening section of the above-described acoustic tube and an acoustic resistance $Z_O$ specific to the air.

In FIG. 11, graph J is a graph showing an absolute value of a reactance component of an acoustic impedance in the case where, as shown in FIG. 10, the lamination direction of the activated carbon 12 is in the same direction as the traveling direction of the sound. Graph K is a graph showing a resistance component of the acoustic impedance. Graph L is a graph showing an absolute value of a reactance component of an acoustic impedance in the case where the lamination direction of the activated carbon 12 is, as shown in FIG. 9, perpendicular to the traveling direction of the sound. Graph M is a graph showing a resistance component of the acoustic impedance.

Figure 12:
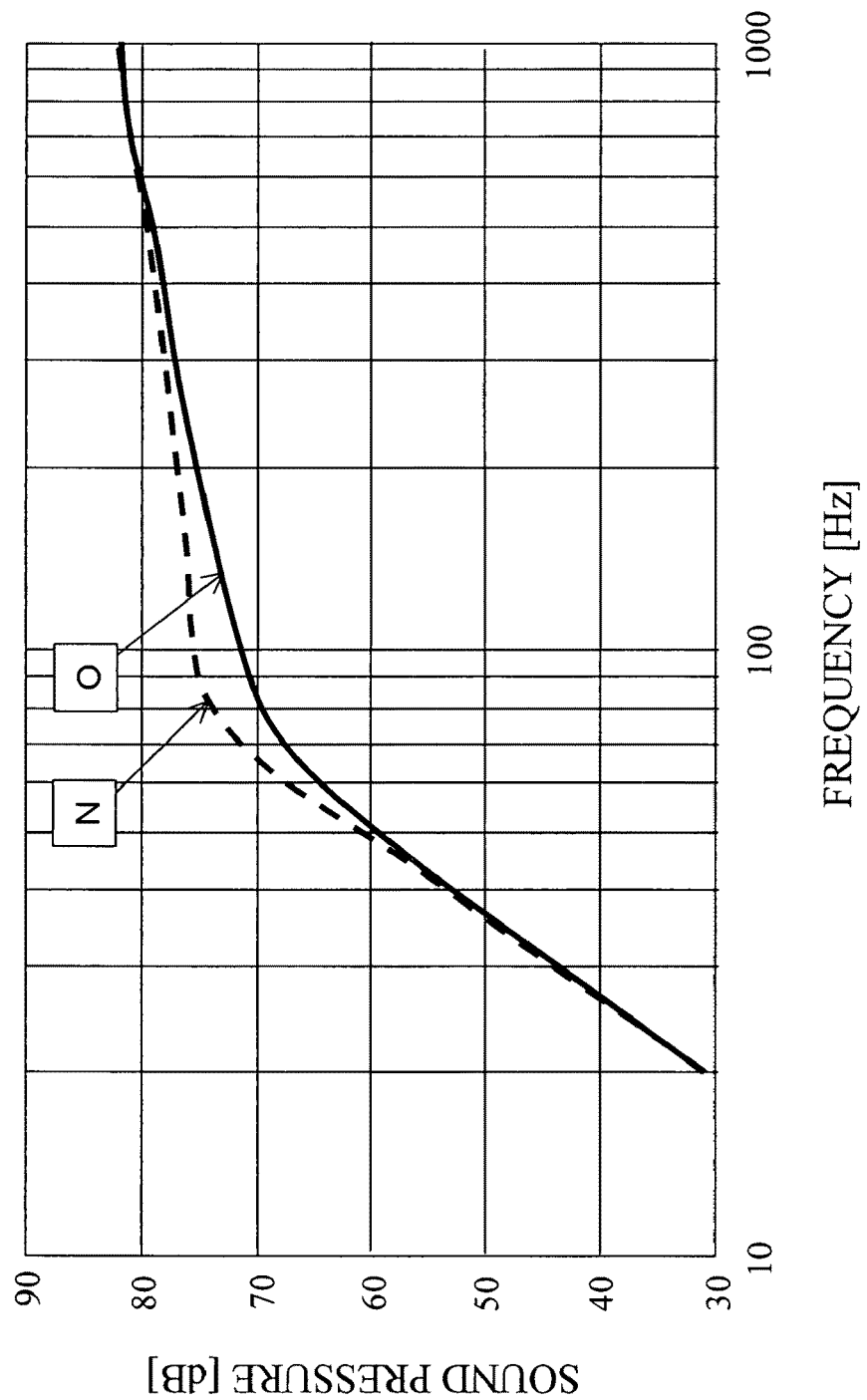
FIG. 12 is a diagram showing an effect, obtained by calculation, of a difference in a resistance components on the sound pressure/frequency characteristic.

According to graph J and graph L, the respective reactance components hardly have any difference, depending on a condition of the lamination direction, in the acoustic characteristic in the bass range of 200 Hz or lower, since an amount of the activated carbon 12 is kept constant at a weight of 40 g. However, the resistance components indicate, for example at a frequency of 100 Hz, about 1 in a graph K, and 0.3 in graph M. That is, it is clear that values of the resistance components differ by three times depending on the lamination direction of the activated carbon 12 with respect to the traveling direction of the sound. FIG. 12 is a diagram showing an effect, obtained by calculation, of the difference in the resistance components on the sound pressure/frequency characteristic. As a condition of the calculation, the cabinet is set as a bass-reflex system having a capacity of 1 liter, and the speaker unit has an 8 cm diameter. In FIG. 12, graph N is a graph showing a sound pressure/frequency characteristic in the case where the resistance component of the acoustic impedance is 0.3. Graph O is a graph showing a sound pressure/frequency characteristic in the case where the resistance component of the acoustic impedance is 1.0. When graph N and graph O are compared to each other, it is clear that, in graph N which is for the case of resistance component of 0.3, a sound pressure level in the vicinity of a frequency of 90 Hz is higher by about 4.5 dB. That is, the activated carbon 12 is laminated such that the lamination direction thereof is perpendicular to the traveling direction of the sound, whereby the gap, which is in the same direction as the above-described traveling direction of the sound, is formed in the activated carbon 12, between the fiber and the fiber thereof. Accordingly, the sound radiated from the speaker unit easily passes through the gap. That is, there is a small loss in the process of a gaseous body flowing into the micro pores, and thus deterioration in the sound pressure level in the bass range is reduced significantly.

Figure 13:
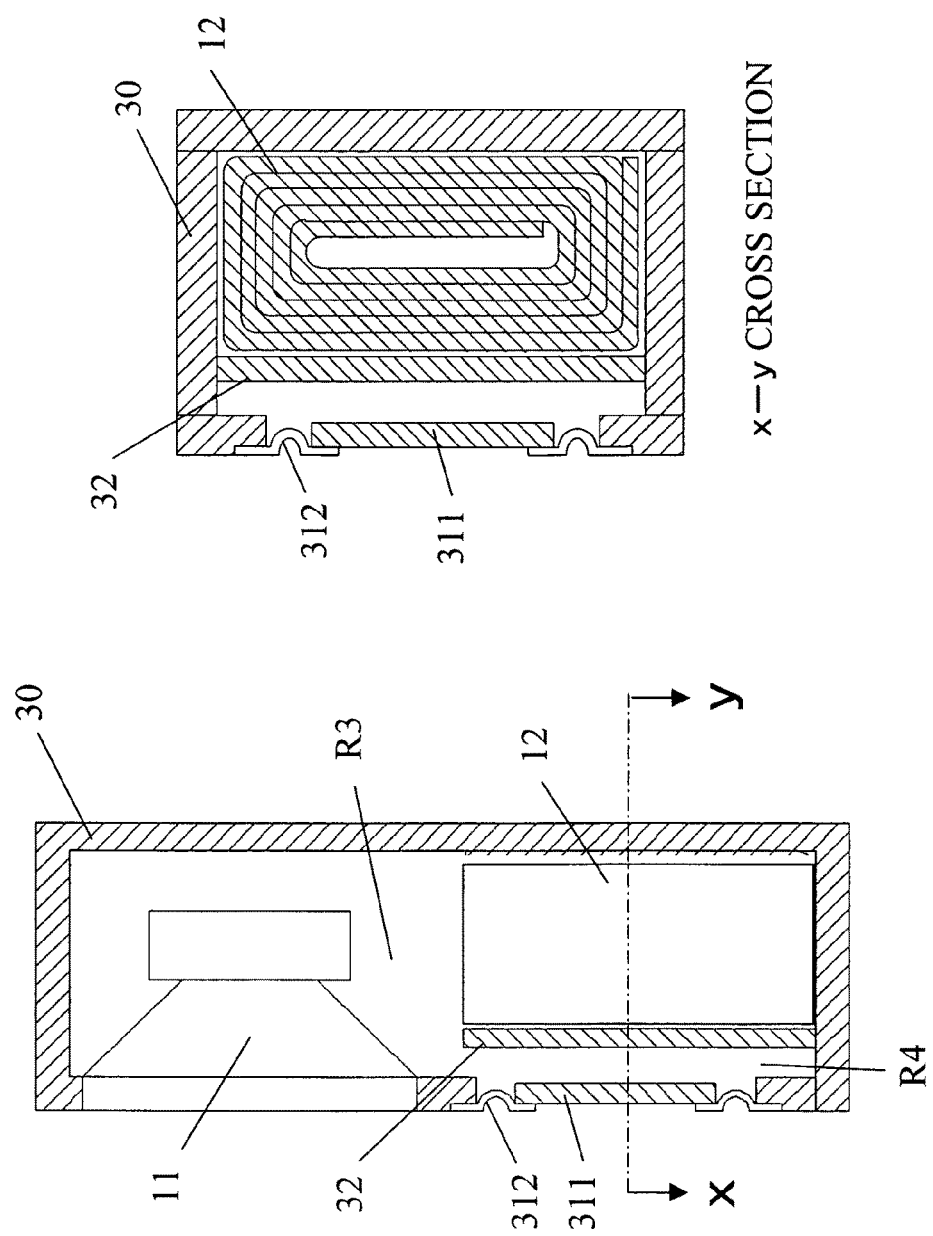
FIG. 13 is a tectonic profile of the loudspeaker system having the activated carbon 12, which is formed by cloth-type activated carbon fiber, laminated in a spiral manner and located in an inside of a cabinet 30.

As above described, it is particularly preferable that the lamination direction of the activated carbon 12 is oriented perpendicular to the traveling direction of the sound. Note that, as a different lamination method in order to obtain the same effect as the case of lamination of the activated carbon 12 in the lamination direction as shown in FIG. 9, there is a method of lamination in a spiral manner, for example, as shown in FIG. 13. FIG. 13 is a tectonic profile of the loudspeaker system having the activated carbon 12, which is formed by the cloth-type activated carbon fiber, laminated in a spiral manner and located in the inside of the cabinet 30. In FIG. 13, the activated carbon 12 is laminated in a spiral manner as shown in an x-y cross section view, and located in the inside of the cabinet 30. In this case, the gap between the fiber and the fiber of the activated carbon 12 is formed in the same direction as the traveling direction of the sound. Accordingly, a structure is created, where the sound radiated from the back surface of the speaker unit 11 easily passes through between the fiber and the fiber of the cloth-type, whereby the same effect as the lamination method as shown in FIG. 9 can be obtained.

Note that the above-described difference in the lamination direction of the activated carbon 12 has a similar effect on the loudspeaker systems according to the above-described first and second and below-described fourth embodiments, and not limited to the present embodiment. Further, the above-described activated carbon 12 may be formed by folding and laminating a sheet of the cloth-type activated carbon fiber, or may be formed by laminating several sheets of cloth-type activated carbon fiber.

Fourth Embodiment

Figure 14:
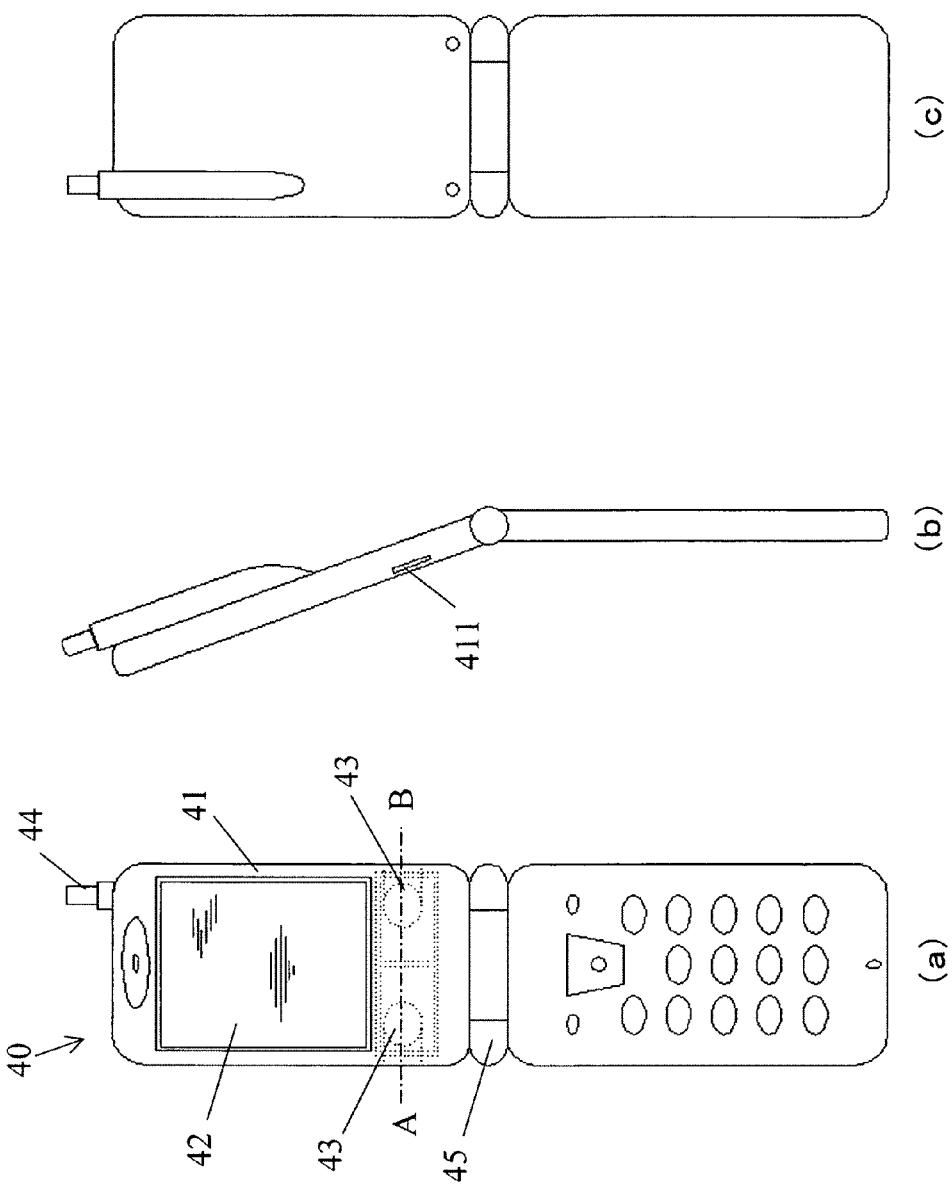
FIG. 14 is a diagram showing a cellular phone having the loudspeaker system of the present invention accommodated therein.
Figure 15:
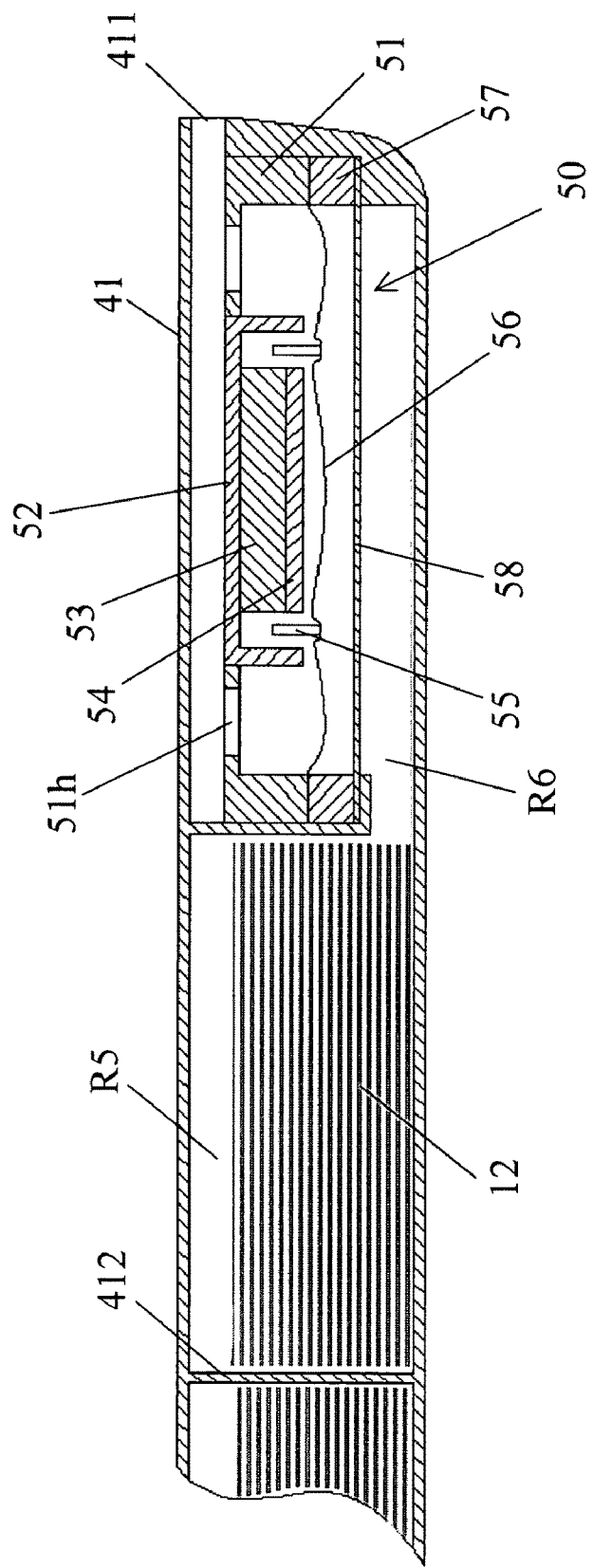
FIG. 15 is a cross-section view of the cellular phone which is cut along a line AB shown in FIG. 14.

The loudspeaker systems according to the above-described first to third embodiment can be applied to, for example, a portable terminal device such as a cellular phone. As an example of another portable terminal device, there is a portable apparatus such as an HDD player and a semiconductor memory player. Hereinafter, with reference to FIG. 14 and FIG. 15, the cellular phone, as the portable terminal device, to which the loudspeaker system of the present invention is applied, will be described as a fourth embodiment. FIG. 14 is a diagram showing the cellular phone having the loudspeaker system of the present invention accommodated therein. FIG. 14(a) shows a front view of the cellular phone. FIG. 14(b) shows a side view of the cellular phone. FIG. 14(c) shows a back side view of the cellular phone. FIG. 15 is a cross-section view of the cellular phone which is cut along a line AB shown in FIG. 14.

In FIG. 14, the cellular phone 40 is, for example, a cellular phone which can be folded into two. The cellular phone 40 approximately comprises a main frame case 41, a liquid crystal display 42, loudspeaker systems 43, an antenna 44, and a hinge section 45. The liquid crystal display 42 is fixed to the main frame case 41. As shown in FIG. 14(b), an opening section 411 is formed on a side surface of the main frame case 41. Details thereof will be described hereinbelow. However, the loudspeaker systems 43 are such loudspeaker systems that have the same structure as any of the loudspeaker systems according to the first to third embodiments. The loudspeaker systems 43 are situated between the liquid crystal display 42 and the hinge section 45. As shown in FIG. 15, each of the loudspeaker systems 43 approximately comprises, a speaker unit 50 and activated carbon 12. With regard to a cabinet of the loudspeaker systems 43, an internal space of the main frame case 41 of the cellular phone 40, in FIG. 15, is used as the cabinet. That is, in FIG. 14 and FIG. 15, the cabinet of the loudspeaker systems 43 is formed by the main frame case 41, in a manner integrated with the main frame case 41. Further, a divider 412 for separating the cabinet of the two loudspeaker systems 43 on the right and left is located in an inside of the main frame case 41. The activated carbon 12 is located in an internal space R5 of the cabinet formed in the inside of the main frame case 41.

The speaker unit 50 is an electrodynamic speaker. The speaker unit 50 comprises a frame 51, a yoke 51, a magnet 53, a plate 54, a voice coil 55, a diaphragm 56, a gasket 57, and a dustproof mesh 58. The yoke 52 is firmly fixed to a lower surface of the frame 51, and integrated with the frame 51. The magnet 53 is, for example, of a column shape, and firmly fixed to a lower surface of the yoke 52. The plate 54 is, for example, of a column shape, and firmly fixed to a lower surface of the magnet 53. A magnetic gap is formed between the yoke 52 and an outer circumference of the plate 54. The diaphragm 56 is constituted of a resin film such as, for example, polyethylene naphthalate and polyimide. An outer circumference of the diaphragm 56 is firmly fixed so as to be sandwiched in between the gasket 57 and the frame 51. The voice coil 55 is a coil, for example, formed in a column shape. The voice coil 55 is firmly fixed to the diaphragm 56 so as to be located in the above-described magnetic gap. The above-described gasket 57 is, for example, of a annular shape, and is designed not to allow the diaphragm 56 to have contact with the dustproof mesh 58, thereby securing amplitude of the diaphragm 56. The gasket 57 is firmly fixed to the lower surface of the frame 51. The dustproof mesh 58 is breathable, and is made of a material of a mesh structure preventing coarse particulates such as dust. The dustproof mesh 58 is firmly fixed to a lower surface of the gasket 57. Further, the dustproof mesh 58 is located so as to divide off the activated carbon 12 and the speaker unit 50 having the voice coil 55 and diaphragm 56 included therein. On an upper surface of the frame 51, a plurality of sound holes 51h is formed so that a sound radiated from the diaphragm 56 can be radiated from the opening section 411.

The speaker unit 50 is located on a bottom face of the main frame case 41 having a space R6 in between. Note that, as shown in FIG. 15, the speaker unit 50 is located such that a surface of the diaphragm 56 without having voice coil 55 firmly fixed thereon is facing the internal space of the main frame case 41. That is, the voice coil 55 is located, with respect to the activated carbon 12, so as to have the diaphragm 56 situated in between. Here, the above-described dustproof mesh 58 is preferably a mesh having fine openings which can prevent lost strips of short fiber, which are likely to be released from the activated carbon 12, from entering into a side of the diaphragm 56. However, even if the above-described lost strips of the short fiber enter into the diaphragm 56 to a certain extent, since the diaphragm 56 is located, with respect to the voice coil 55, in the internal space side of the main frame case 41, the diaphragm 55 functions as a shielding plate, and consequently the above-described lost strips of the short fiber do not reach the voice coil 55. As a result, it is possible prevent a failure due to an electrical short circuit and an occurrence of an abnormal sound, both of which are caused by the above-described lost strips of short fiber having contact with the voice coil 55.

Next, an operation of the loudspeaker system 43 shown in FIG. 15 will be described. The speaker unit 50 is an electrodynamic speaker, and an operation thereof is the same as that of a general electrodynamic speaker, and thus an explanation thereof is omitted. For example, when the cellular phone 40 receives a receiving signal from the antenna 44, the receiving signal is processed appropriately by a signal processing section or the like (not shown), and then inputted to the speaker unit 50. And when, for example, a melody signal for a receive call is applied to the speaker unit 50, a driving force is generated in the voice coil 55. With the driving force, the diaphragm 56 vibrates, and then a melody sound is generated. The melody sound generated from an upper surface of the diaphragm 56 is radiated from the opening section 411 via the sound holes 51h formed on the frame 51. On the other hand, a sound generated from a lower surface of the diaphragm 56 passes through the dustproof mesh 58, and changes a pressure of the internal spaces of the cabinet (spaces R5 and R6) formed in the main frame case 41. However, due to physical adsorption by the activated carbon 12, a change in the pressure of the above-described internal spaces is suppressed, and a capacity of the internal spaces expand equivalently.

As above described, the loudspeaker system of the present invention is applied to the cellular phone, whereby rich bass reproduction can be realized for the cellular phone.

Figure 16:
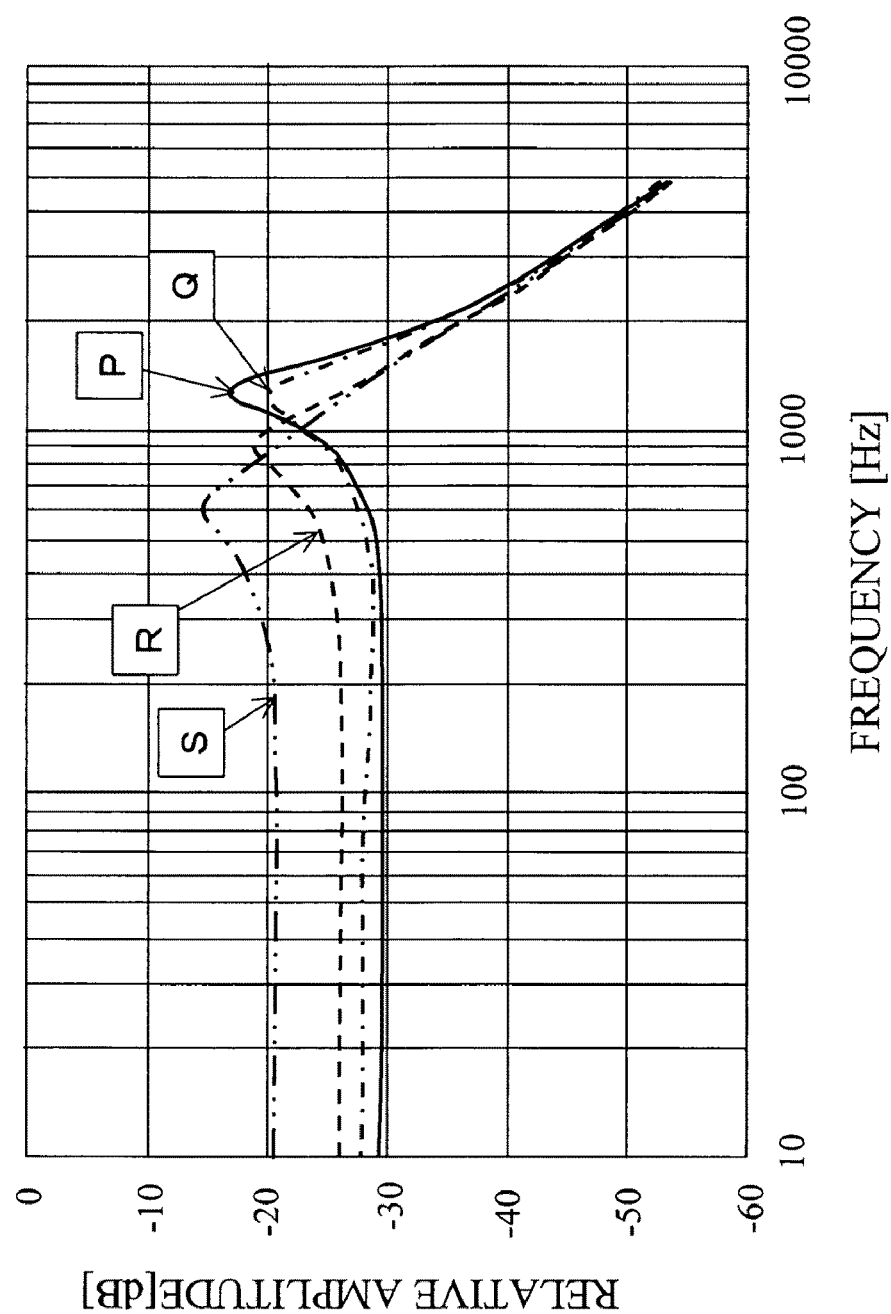
FIG. 16 is a diagram showing a measurement result of an amplitude characteristic of a diaphragm 56 of a speaker unit 50 in the loudspeaker system 43 shown in FIG. 14 and FIG. 15.

Further, in a general cellular phone, an internal capacity thereof is very small and a diameter of the speaker unit to be accommodated is also small. Due to these reasons, a reproduction range of the loudspeaker system which reproduces a ring tone and a speech sound tends to become a range of 500 Hz or more. On the other hand, in the case where conventional granular activated carbon is applied as the activated carbon 12, an effect of the physical adsorption is hardly obtained in a high range of 100 Hz-200 Hz or higher as above described. FIG. 16 is a diagram showing a measurement result of amplitude characteristics of the diaphragm 56 of the speaker unit 50 in the loudspeaker system 43 shown in FIG. 14 and FIG. 15. In FIG. 16, the capacity of the internal spaces (the spaces R5 and R6) of the cabinet is set to 1 cc. The diameter of the speaker unit 50 is set to $\phi$14 mm. Further, FIG. 16 relatively shows the amplitude characteristics, respectively, by setting an amplitude characteristic of a case without the activated carbon 12 as graph P, an amplitude characteristic of a case with the conventional granular activated carbon (average particle size; 0.1 to 0.3 mm, weight; 100 mg) included as graph Q, an amplitude characteristic of a case with cloth-type activated carbon fiber (specific surface area; 2000 m$^2$/g, weight; 100 mg) included as graph R, and an amplitude characteristic of the speaker unit 50 alone as graph S. Note that the amplitude characteristic relatively shown is referred to as a relative amplitude. Further, the amplitude characteristic of the speaker unit 50 alone corresponds to an amplitude characteristic measured with speaker unit 50 alone without having the speaker unit 50 accommodated in the main frame case 41.

In view of graph S showing the amplitude characteristic of the speaker unit 50 alone, it is clear that a peak of an amplitude is situated at a resonance frequency of $f_{OS}$=606 Hz. Further, in a low range which is equal to or lower than the resonance frequency $f_{OS}$, a value of the amplitude stays constant due to an effect of stiffness of the diaphragm 56.

In view of graph P showing the amplitude characteristic of the case without the activated carbon 12, due to the effect of the stiffness of air in the spaces R5 and R6, a resonance frequency increases and is expressed as $f_{OP}$=1256 Hz. Further, in a low range which is equal to or lower than the resonance frequency $f_{OP}$, the effect of the stiffness of the air in the spaces R5 and R6 is larger compared to the stiffness of the diaphragm 56. Accordingly, in the low range which is equal to or less than the resonance frequency $f_{OP}$, the value of the amplitude stays constant due to the effect of the stiffness of the air in the spaces R5 and R6.

In view of graph Q showing the amplitude characteristic of the case with the conventional granular activated carbon included, a resonance frequency is expressed as $f_{OQ}$=1256

Hz, which is the same frequency as graph P of the case without the activated carbon 12. Here, as described in the above first embodiment, based on such a relation that the resonance frequency is proportional to the square of a cabinet capacity, it is clear that, in the vicinity of a frequency 1200 Hz, there hardly has an effect of the capacity expansion caused by the granular activated carbon, that is, the effect of the physical adsorption can hardly be obtained. On the other hand, in a low range which is equal to or lower than the resonance frequency $f_{OQ}$, unlike graph P of the case without the activated carbon 12, the value of the amplitude increases when the frequency decreases. This shows that the effect of the physical adsorption by the granular activated carbon becomes visible as the frequency decreases. When graph P and graph Q are compared to each other, in the case of the granular activated carbon having an average particle size of 0.1 to 0.3 mm, the effect of the physical adsorption can be obtained in a low range of about 200 Hz or lower. However, the effect of the physical adsorption can hardly be obtained in a high range of 200 Hz or higher. This result also corresponds to a characteristic of FIG. 6 disclosed in the above-described patent document 1.

In view of graph R showing the amplitude characteristic of the case with the cloth-type activated carbon fiber included, a resonance frequency is expressed as $f_{OR}=879$ Hz. Compared to the resonance frequency $f_{OP}$ in graph P of the case without the activated carbon 12, the resonance frequency in the graph R is lower. Here, as described in the above first embodiment, based on such a relation that the resonance frequency is proportional to the square of the cabinet capacity, an expansion ratio of a cabinet capacity of the case with the activated carbon fiber of the present invention included, compared to the case without the activated carbon 12, is expressed as $(f_{OP}/f_{OR})^2=2.04$. That is, it is clear that the equivalent capacity of the cabinet is expanded by about two times. On the other hand, in graph R, the value of the amplitude stays constant in a low range which is equal to or lower than the resonance frequency $f_{OR}$. Further, in the low range which is equal to or lower than the resonance frequency $f_{OR}$, the value of the amplitude increases compared to graph P and graph Q. Further, this increase in the amplitude is seen in a high range of 200 Hz or higher. That is, it is clear that, with the use of the activated carbon fiber of the present invention, a significant effect of the physical adsorption can be obtained even in the high range of 200 Hz or higher.

As above described, in the case of the granular activated carbon, macro pores thereof, which acts as paths for a gaseous body, act as a high-cut filter, and thus a flow of the gaseous body into micro pores is suppressed in the high range. On the other hand, in the case of the activated carbon fiber whose micro pores situated on a surface thereof, the macro pores are not formed, and thus an influence of the high-cut filter which is caused by the macro pores are reduced.

Figure 17:
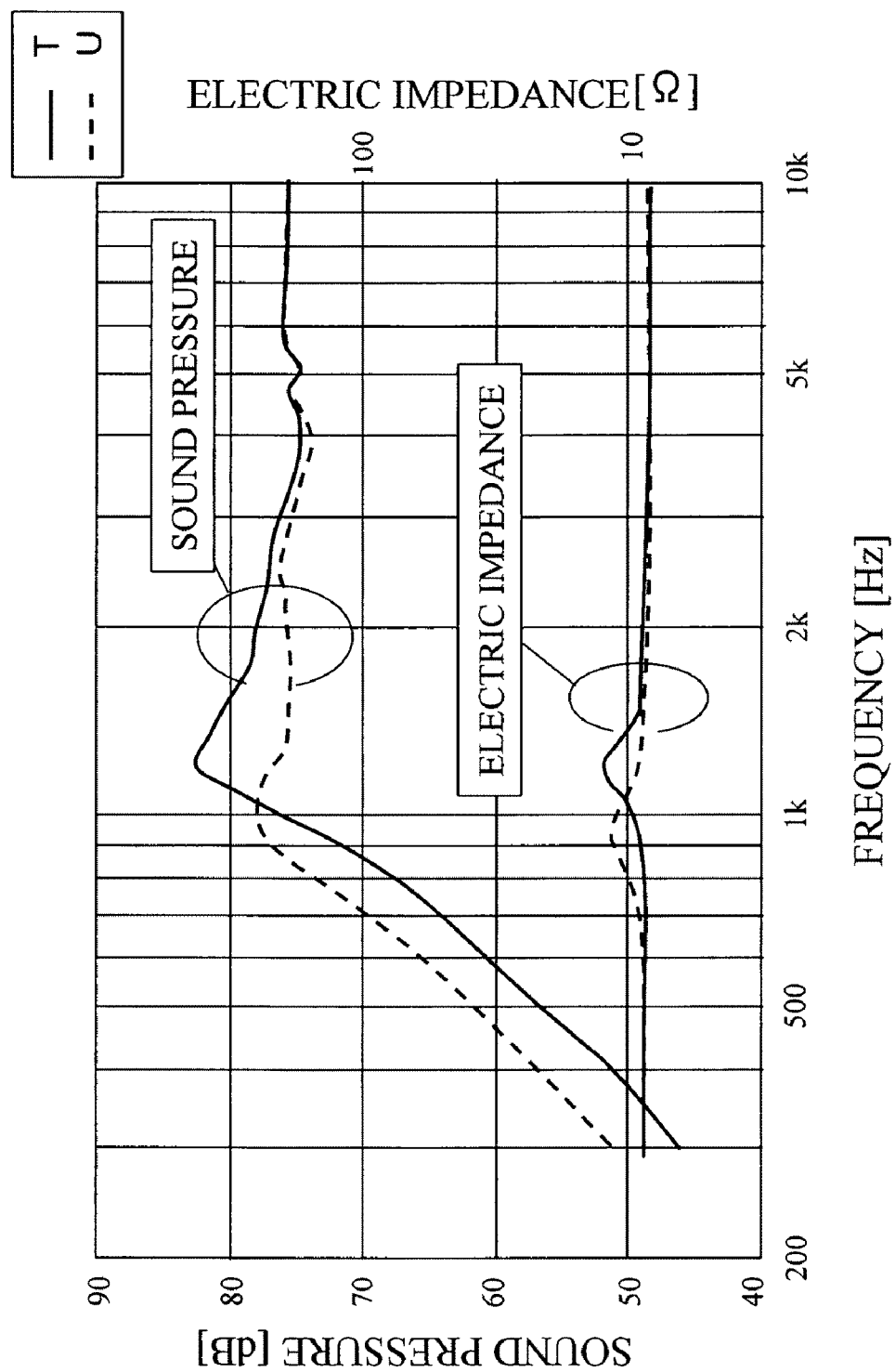
FIG. 17 is a diagram showing a sound pressure/frequency characteristic and an electric impedance characteristic in the case where a micro speaker having a diameter of $\phi 14$ mm is accommodated in a cabinet having a capacity of 1 cc.

FIG. 17 is a diagram showing a sound pressure/frequency characteristic and an electric impedance characteristic in the case where a micro speaker having a diameter of φ14 mm is accommodated in a cabinet having a capacity of 1 cc. In FIG. 17, graph T shows a sound pressure/frequency characteristic and an electric impedance characteristic of a case without the activated carbon 12. Graph U shows a sound pressure/frequency characteristic and an electric impedance characteristic of a case with the activated carbon fiber used as the activated carbon 12. When the sound pressure/frequency characteristics are compared between graph T and graph U, it is clear that a low range in graph U is further expanded. In addition, with regard to the electric impedance characteristic in graph U, the resonance frequency shifts to a low range side compared to the resonance frequency in graph T. In this way, with the use of the activated carbon fiber as the activated carbon 12, a bass range is expanded significantly.

In this way, a frequency range, in which the effect of the physical adsorption can be obtained, can be expanded to a high range of 100 Hz-200 Hz or higher with the use of the activated carbon fiber, compared to the conventional granular activated carbon, with which the effect of the physical adsorption is obtained only in the bass range of 100 Hz-200 Hz or lower. As a result, it is possible to realize a loudspeaker system which can expand the reproduction range to the bass range even in the case of a portable terminal device whose reproduction frequency range is high.

Note that, according to the present embodiment, the speaker unit 50 is located such that a surface of the diaphragm 56 without having the voice coil 55 fixed thereon is facing the internal space of the main frame case 41, but is not limited to this. The speaker unit 50 shown in FIG. 15 may be located upside down. In this case, the speaker unit 50 is located such that the sound holes 51*h* have contact with the space R6. In this case, the lost strips of short fibers, released from the activated carbon 12, is likely to enter in the vicinity of the voice coil 55. Therefore, in this case, the dustproof mesh is provided to the sound holes 51*h*, whereby it is possible to prevent entering of the lost strips of the short fiber. In this way, the dustproof mesh 58 may be located so as to divide off the speaker unit 50 and the activated carbon 12. Accordingly, the dustproof mesh 58 is set to be accommodated in the speaker unit 50, but, instead of being accommodated in the speaker unit 50, may be situated so as to divide off the speaker unit 50 and the activated carbon 12. In this case, the loudspeaker system 43 is constituted of the speaker unit 50 without the dustproof mesh 58, the activated carbon 12, and the cabinet formed by the main frame case 41. Accordingly, it is possible to prevent the coarse particulates or the like, caused by the activated carbon 12, from entering into the speaker unit 50.

Further, the above-described cabinet of the loudspeaker system 43 utilizes the internal space of the main frame case 41, but may be provided separately from the main frame case 41. Further, it is possible to have a constitution where each of the loudspeaker systems according to the first to third embodiments is attached independently to an exclusive space in the inside of the main frame case 41. In this case, during an assembly process of the cellular phone, it is possible to omit an operation of filling of the activated carbon 21 into the inside of the cabinet integratedly formed with the main frame case 41, which is further practical.

Figure 18:
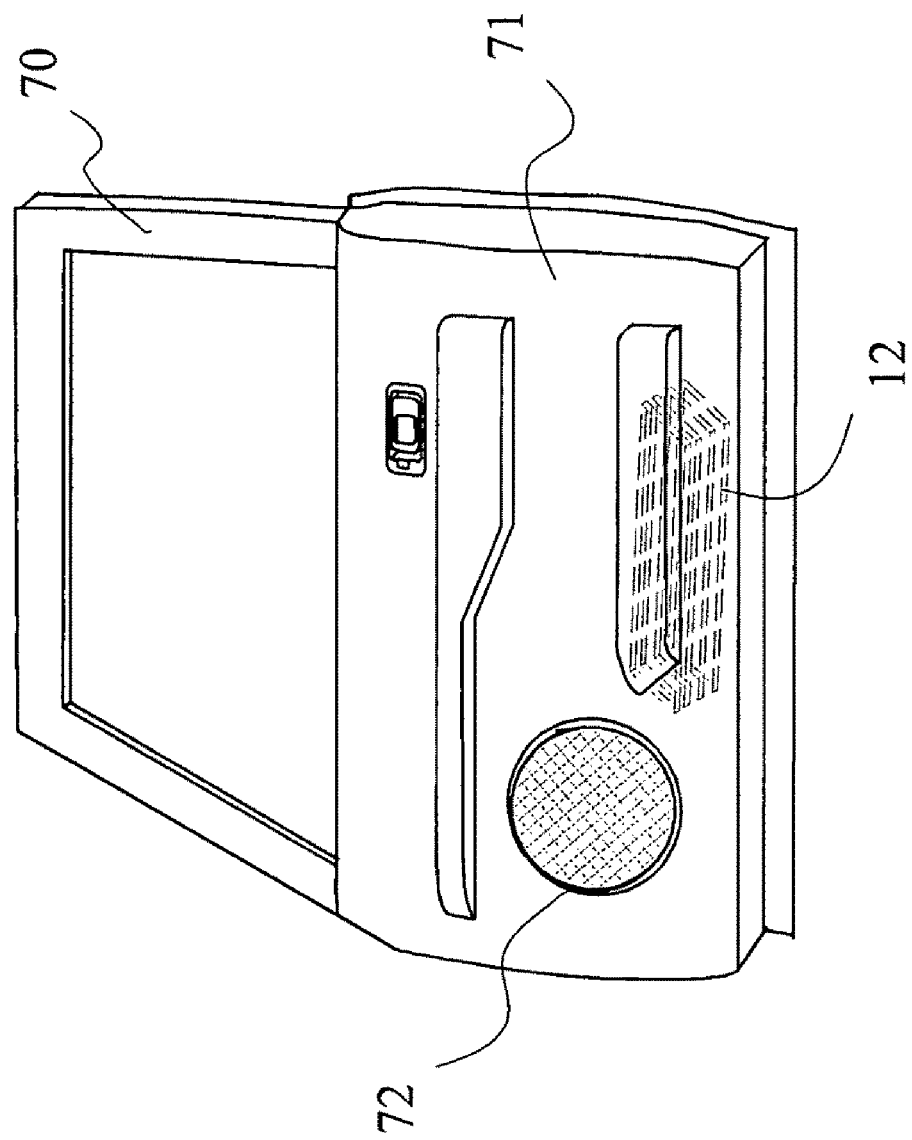
FIG. 18 is a diagram showing an example of the loudspeaker system according to the present invention accommodated in a door of a car.

Further, the loudspeaker systems according to the above-described first to third embodiments may be such a loudspeaker system that is, for example, accommodated not only in the portable terminal device but also in an inside of a car body. First, with reference to FIG. 18, a case where each of the loudspeaker systems according to the above-described first to third embodiments is accommodated in the inside of the car body will be described. As an example of location in the inside of the car body, a door of the car, for example, may be cited. FIG. 18 is a diagram showing an example of the loudspeaker system according to the present invention accommodated in the door of the car.

In FIG. 18, the door of the car comprises a window section 70, a main door unit 71, a speaker unit 72, and activated carbon 12. Here, the speaker unit 72 is, as with the speaker units 11 according to the above-described first to third embodiments, a general electrodynamic speaker. The speaker unit 72 is attached to the main door unit 71. A space is formed in an inside of the main door unit 71. And the activated carbon 12 is located in an internal space of the main door unit 71. In this way, the main door unit 71 functions as a cabinet, and thus the loudspeaker system of the present invention is constituted of the speaker unit 11, the main door unit 71, and the activated carbon 12. As above described, the loudspeaker system of the present invention is accommodated in the door of the car, whereby it is possible to improve expansion of the equivalent capacity even in the case of being accommodated in the main door unit 71 having a conventional art, prevent deterioration in a sound pressure level caused by a loss in acoustic energy, and provide an in-car listening environment capable of reproducing rich bass.

Figure 19:
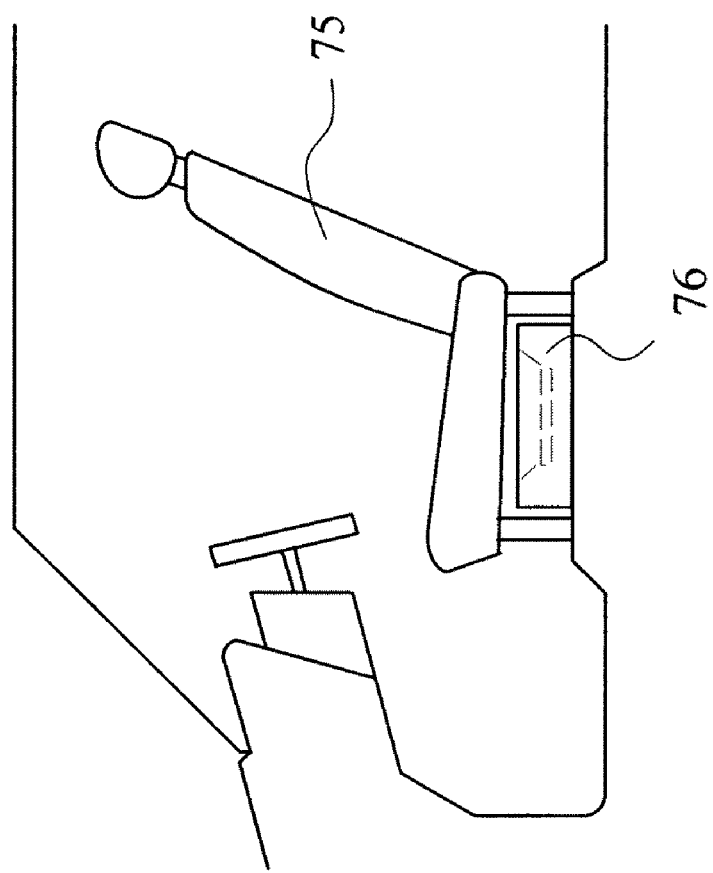
FIG. 19 is a diagram showing an example of a loudspeaker system accommodated in an inside of the car.

Further, the loudspeaker systems according to the above-described first to third embodiments may be, for example, an in-car loudspeaker system which is located in the inside of the car body. FIG. 19 is a diagram showing an example of the loudspeaker system accommodated in the inside of the car. In FIG. 19, the loudspeaker system 76 is, for example, located under a seat 75. Here, the loudspeaker system 76 is any of the loudspeaker systems according to the above-described first to third embodiments, and thus a detailed explanation thereof is omitted. As above described, the loudspeaker system 76 is accommodated in the car, whereby it is possible to improve the expansion of the equivalent capacity even if a cabinet capacity thereof is the same as that of a conventional art, prevent deterioration in the sound pressure level caused by the loss in the acoustic energy, and provide the in-car listening environment capable of reproducing rich bass can be provided.

Figure 20:
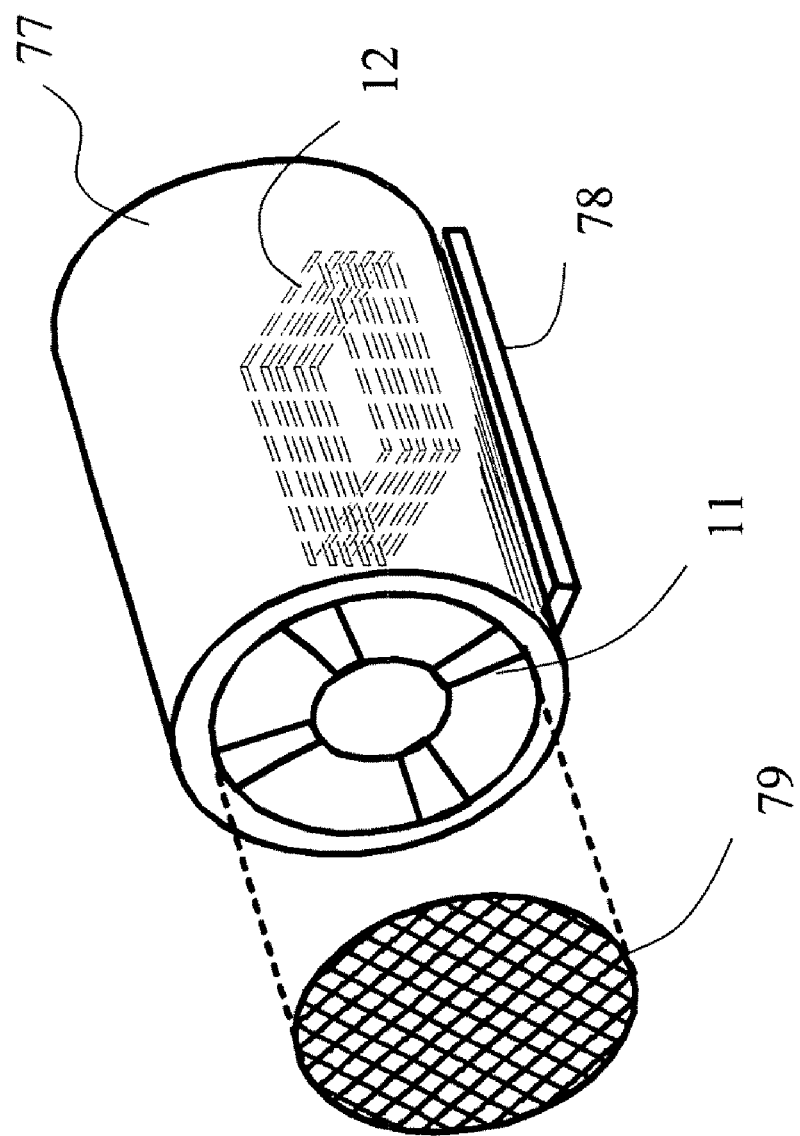
FIG. 20 is a diagram showing another example of the loudspeaker system accommodated in the inside of the car.

Further, the loudspeaker systems according the above-described first to third embodiments may be, for example, an in-car loudspeaker system as shown in FIG. 20. FIG. 20 is a diagram showing another example of the loudspeaker system accommodated in the inside of the car. In FIG. 20, the loudspeaker system comprises a cabinet 77, a pedestal 78, a speaker unit 11, a punching net 79, and the activate carbon 12. The activated carbon 12 is located in an inside of the cabinet 77. Here, the speaker unit 11 and the activated carbon 12 are similar to the above-described speaker unit 11 and the activated carbon 12, and thus a detailed explanation thereof is omitted. As above-described, the loudspeaker system as shown in FIG. 20 is accommodated in the inside of the car, whereby it is possible to improve the expansion of the equivalent capacity even in the case of having the cabinet capacity identical to the conventional art, prevent deterioration in the sound pressure level caused by the loss in the acoustic energy, and provide the in-car listening environment capable of reproducing rich bass. Note that a shape of the cabinet 77 is not limited to a column shape as shown in FIG. 20, but may be of a rectangular parallelepiped.

Figure 21:
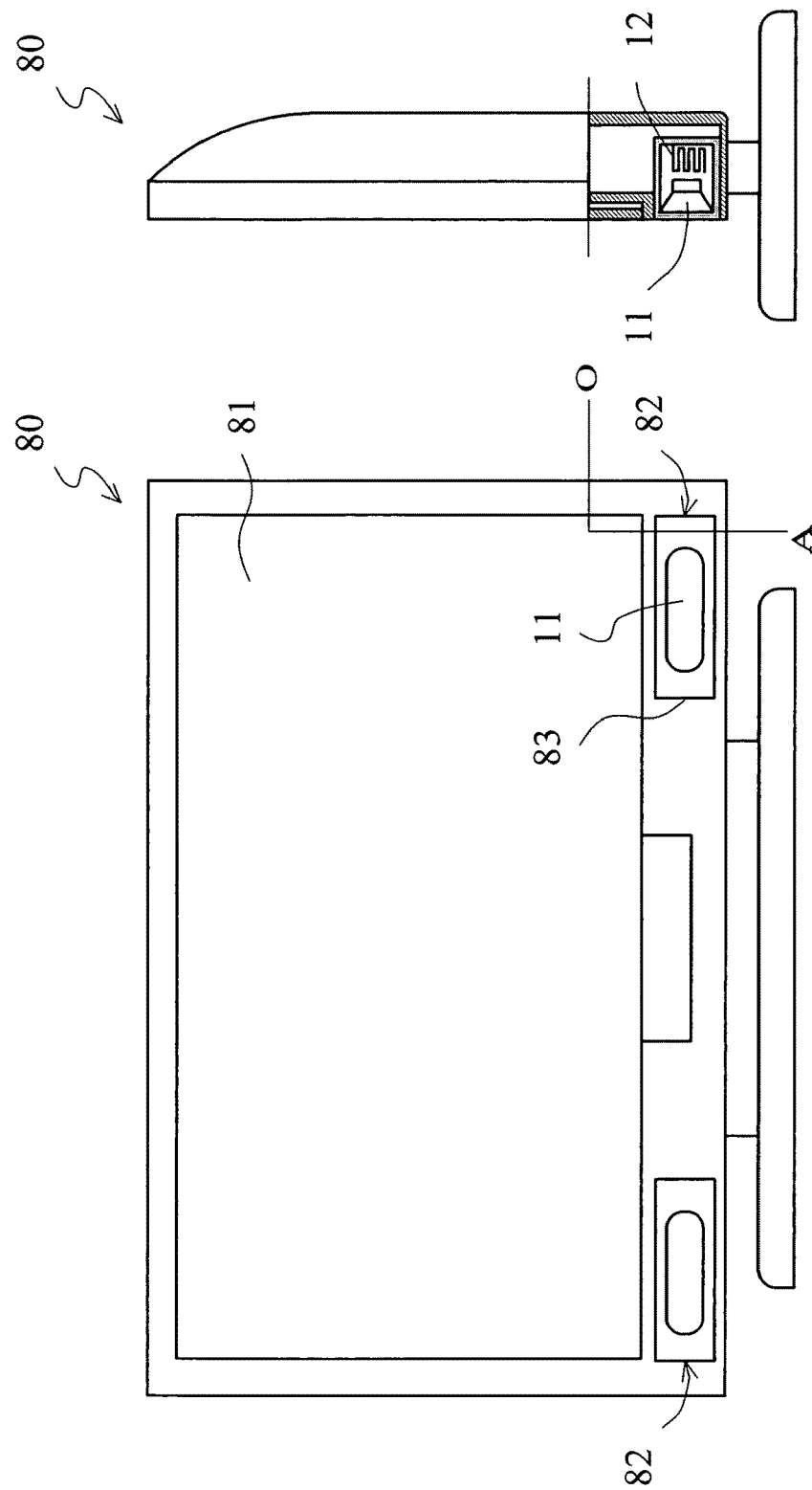
FIG. 21 is a diagram showing an example of constitution of the loudspeaker system according to the present invention accommodated in a flat-screen television.
Figure 22:
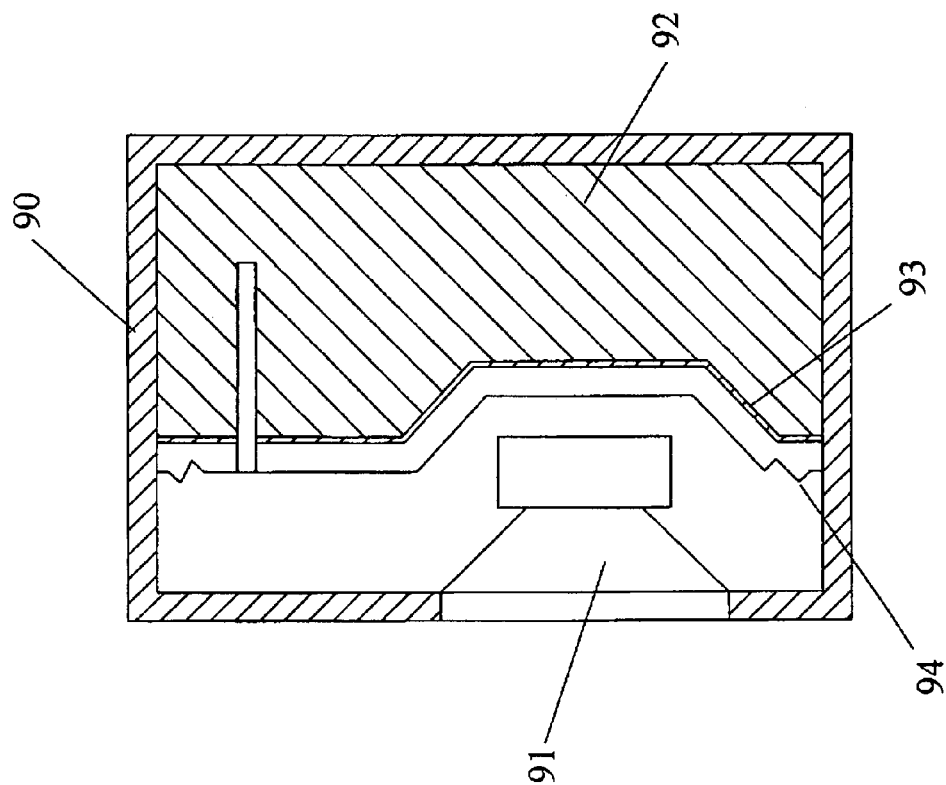
FIG. 22 is a tectonic profile of a main section of a conventional loudspeaker system.
Figure 23:
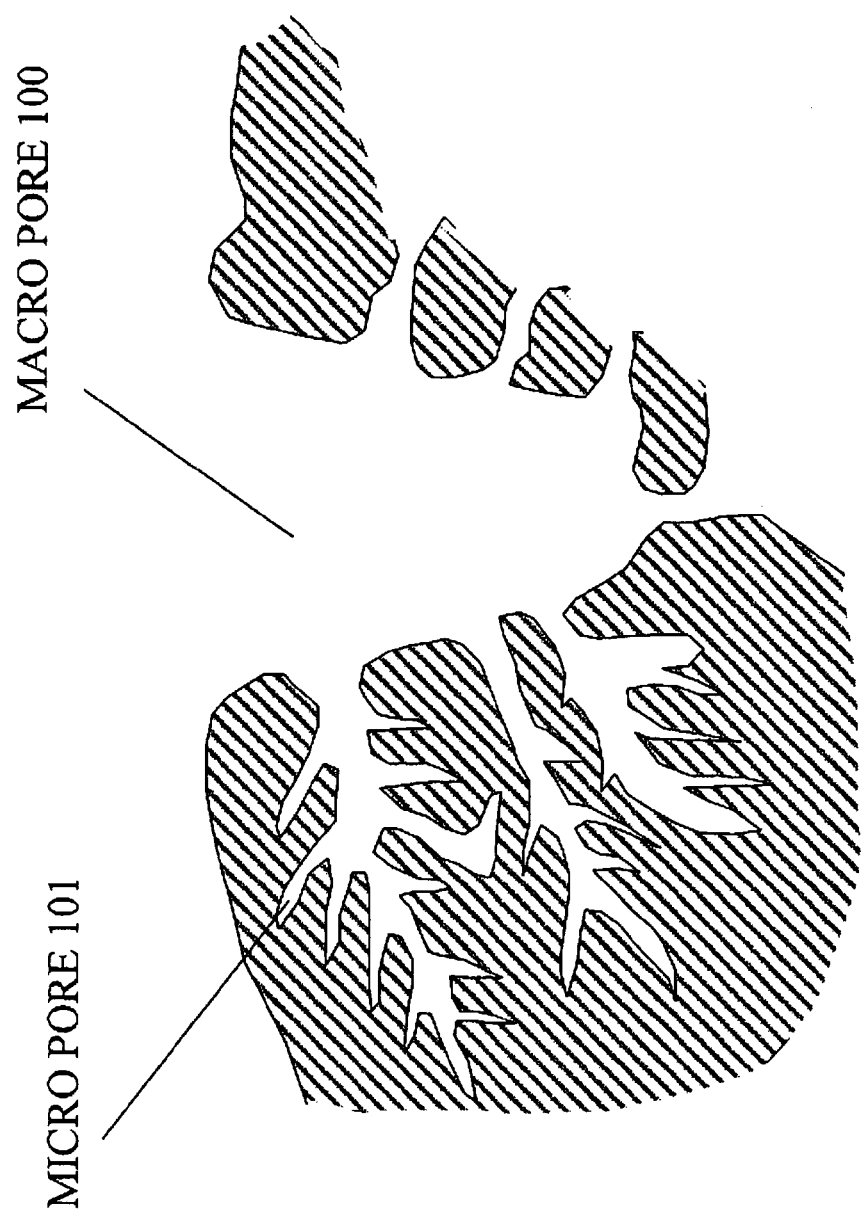
FIG. 23 is a diagram typically showing a structure of pores formed in granular activated carbon.

Next, with reference to FIG. 21, a case where each of the loudspeaker systems according to the above-described first to third embodiments is accommodated in a video device (such as, for example, a Braun tube television, a liquid crystal display television, and a plasma television) will be described. FIG. 21 is a diagram showing an example of constitution of the above-described loudspeaker system accommodated in a flat-screen television, and shows a front view of the flat-screen television and a side view in which a portion thereof is shown as a cross-section view along a line OA. In FIG. 21, the flat-screen television comprises a flat-screen television main body 80, a display 81, and two loudspeaker systems 82. The loudspeaker systems 82 are any of the loudspeaker systems described in the first to third embodiments, and thus a detail explanation thereof is omitted.

Cabinets 83 of the loudspeaker systems 82 are located in an inside of the housing accommodated in a portion under the display. A speaker unit 11 is, for example, an ellipse shaped speaker unit, and attached to each of the cabinets 83. Activated carbon 12 is located in an inside of each of the cabinets 83. As above described, the loudspeaker systems of the present invention are accommodated in the flat-screen television main body 80, whereby it is possible to improve the expansion of the equivalent capacity even in the case of having the cabinet capacity identical to the conventional art, prevent deterioration in the sound pressure level caused by the loss in the acoustic energy, and provide the in-car listening environment capable of reproducing rich bass. Note that each of the loudspeaker systems 82 shown in FIG. 21 is attached at the portion under the display. However, each loudspeaker system may be located at both sides of the display 81.

As above described, the loudspeaker systems according to the above-described first to third embodiments are accommodated in various devices and vehicles, whereby it is possible to improve the expansion of the equivalent capacity in each of the devices and in the inside of the vehicles, prevent deterioration in the sound pressure level caused by the loss in the acoustic energy, and realize rich bass reproduction.

Note that in the above-described first to fourth embodiments, the speaker units 11, 50 and 72 may be the electrodynamic speaker, and also may be a speaker of, for example, a piezoelectric type, an electrostatic type, and an electromagnetic type, etc.

INDUSTRIAL APPLICABILITY

With activated carbon fiber located in an inside of a cabinet, the present invention improves expansion of the equivalent capacity, and prevents deterioration in a sound pressure level caused by a loss in acoustic energy. Thus, the invention is applicable to a liquid crystal display television and a PDP (plasma display) whose thinning is progressing, a stereo unit, a speaker for a home theater of 5.1-channel reproduction, and in-car audio equipment, etc. all of which are capable of reproduce rich bass.

The invention claimed is:

1. A loudspeaker system, comprising:
   a cabinet;
   a speaker unit attached to the cabinet; and
   fibrous activated carbon located in an internal space of the cabinet, the fibrous activated carbon being formed as one of a cloth layer of fibrous activated carbon folded in a laminated manner, or as a plurality of cloth layers of fibrous activated carbon arranged in a laminated manner.

2. The loudspeaker system according to claim 1, wherein the cabinet is a closed-type cabinet.

3. The loudspeaker system according to claim 1, further comprising an acoustic port which is attached to the cabinet, and acoustically connects the internal space of the cabinet with an external space thereof.

4. The loudspeaker system according to claim 3, wherein the activated carbon is firmly fixed to an inside of the cabinet so as not to block a space between an opening section, which is one of a plurality of opening sections at both edges of the acoustic port and connected to the internal space of the cabinet, and the speaker unit.

5. The loudspeaker system according to claim 1, further comprising a passive radiator which is attached to the cabinet and driven in response to vibration of the speaker unit.

6. The loudspeaker system according to claim 5, wherein the activated carbon is firmly fixed to the inside of the cabinet so as not to block a space between the speaker unit and the passive radiator.

7. The loudspeaker system according to claim 5, further comprising a plate-like material firmly fixed between the passive radiator and the activated carbon such that an air gap is formed between the passive radiator and the plate-like material.

8. The loudspeaker system according to claim 1, further comprising a shielding material in which the activated carbon is wrapped, the shielding material being configured to block at least air from passing therethrough.

9. The loudspeaker system according to claim 8, wherein the shielding material comprises a thin film.

10. The loudspeaker system according to claim 9, wherein a material of the thin film is polyvinyl chloride or polyvinylidene chloride.

11. The loudspeaker system according to claim 1, wherein the activated carbon comprises phenol resin.

12. The loudspeaker system according to claim 1, wherein the speaker unit is of any of an electrodynamic type, a piezoelectric type, an electrostatic type, or an electromagnetic type.

13. The loudspeaker system according to claim 1, wherein a specific surface area of the activated carbon is 500 $m^2/g$ or more.

14. The loudspeaker system according to claim 1, wherein a lamination direction of the activated carbon is perpendicular to a traveling direction of a sound radiated from the speaker unit.

15. The loudspeaker system according to claim 14, wherein the activated carbon is laminated in a spiral manner.

16. A portable terminal device comprising;
the loudspeaker system described in claim 1; and
a case supporting the loudspeaker system.

17. The portable terminal device according to claim 16, wherein:
the speaker unit comprises:
a voice coil; and
a diaphragm having the voice coil firmly fixed on one surface thereof;
the speaker unit is attached such that another surface of the diaphragm faces the internal space.

18. The portable terminal device according to claim 16, wherein the loudspeaker system further comprises a dust-proof material which is firmly fixed to the inside of the cabinet so as to divide off the speaker unit and the activated carbon.

19. A car, comprising:
the loudspeaker system described in claim 1; and
a car body having the loudspeaker system located in an inside thereof.

20. A video device, comprising:
the loudspeaker system described in claim 1; and
a housing having the loudspeaker system located in an inside thereof.

\* \* \* \* \*